United States Patent
Kato et al.

(10) Patent No.: US 11,676,054 B2
(45) Date of Patent: Jun. 13, 2023

(54) COMPUTER-READABLE RECORDING MEDIUM RECORDING LEARNING PROGRAM AND LEARNING METHOD

(71) Applicant: FUJITSU LIMITED, Kawasaki (JP)

(72) Inventors: Masaya Kato, Kawasaki (JP); Takuya Sakamoto, Yokohama (JP); Atsushi Nukariya, Kawagoe (JP)

(73) Assignee: FUJITSU LIMITED, Kawasaki (JP)

( * ) Notice: Subject to any disclaimer, the term of this patent is extended or adjusted under 35 U.S.C. 154(b) by 475 days.

(21) Appl. No.: 16/942,821

(22) Filed: Jul. 30, 2020

(65) Prior Publication Data

US 2021/0073666 A1 Mar. 11, 2021

(30) Foreign Application Priority Data

Sep. 9, 2019 (JP) .............................. JP2019-164006

(51) Int. Cl.
*G06N 3/08* (2023.01)
*G06N 3/082* (2023.01)
(Continued)

(52) U.S. Cl.
CPC ................ *G06N 7/01* (2023.01); *G06N 3/08* (2013.01); *G06N 3/082* (2013.01); *G06N 7/06* (2013.01)

(58) Field of Classification Search
CPC .............. G06N 7/01; G06N 7/06; G06N 3/08
See application file for complete search history.

(56) References Cited

U.S. PATENT DOCUMENTS

2018/0322607 A1 11/2018 Mellempudi et al.
2019/0042948 A1 2/2019 Lee et al.
(Continued)

FOREIGN PATENT DOCUMENTS

| JP | 2017-156941 A | 9/2017 |
| JP | 2019-032833 A | 2/2019 |
| JP | 2019-079535 A | 5/2019 |

OTHER PUBLICATIONS

Schulman, John, et al. "Gradient estimation using stochastic computation graphs." Advances in Neural Information Processing Systems 28 (2015). (Year: 2015).*

(Continued)

*Primary Examiner* — Eric Nilsson
(74) *Attorney, Agent, or Firm* — Fujitsu Patent Center

(57) ABSTRACT

A non-transitory computer-readable recording medium stores therein a learning program for causing a computer to execute a process comprising: referring to, at time of learning a computation model that is a target of deep learning and has a plurality of nodes, a storage unit in which route information that indicates a calculation route followed by a tensor in each stage of learning prior to the time of learning, and statistical information regarding a position of a decimal point used in the calculation route are associated with each other; acquiring, when executing each piece of calculation processing set in each of the plurality of nodes at the time of learning, the statistical information corresponding to the route information that reaches each of the plurality of nodes; and executing the each piece of calculation processing using the position of the decimal point specified by the acquired statistical information.

6 Claims, 22 Drawing Sheets

(51) Int. Cl.
*G06N 7/01* (2023.01)
*G06N 7/06* (2006.01)

(56) References Cited

U.S. PATENT DOCUMENTS

2019/0122106 A1    4/2019   Lee et al.
2019/0265949 A1    8/2019   Ito

OTHER PUBLICATIONS

Sakr, Charbel, Yongjune Kim, and Naresh Shanbhag. "Analytical guarantees on numerical precision of deep neural networks." International Conference on Machine Learning. PMLR, 2017. (Year: 2017).*

Lacey, Griffin, Graham W. Taylor, and Shawki Areibi. "Stochastic layer-wise precision in deep neural networks." arXiv preprint arXiv:1807.00942 (2018). (Year: 2018).*

Courbariaux, Matthieu, Yoshua Bengio, and Jean-Pierre David. "Training deep neural networks with low precision multiplications." arXiv preprint arXiv:1412.7024 (2014). (Year: 2014).*

Extended European Search Report dated Feb. 12, 2021 for corresponding European Patent Application No. 20187391.6, 8 pages.

* cited by examiner

FIG. 4

| Key | STATISTICAL INFORMATION STORAGE ADDRESS |
|---|---|
| hash1 | 0x00000001 |
| hash2 | 0x00000002 |
| hash3 | 0x00000003 |
| hash4 | 0x00000004 |
| hash5 | 0x00000005 |
| hash6 | 0x00000006 |

COMPUTER-READABLE RECORDING MEDIUM RECORDING LEARNING PROGRAM AND LEARNING METHOD

CROSS-REFERENCE TO RELATED APPLICATION

This application is based upon and claims the benefit of priority of the prior Japanese Patent Application No. 2019-164006, filed on Sep. 9, 2019, the entire contents of which are incorporated herein by reference.

FIELD

The embodiments discussed herein are related to a learning program and a learning method.

BACKGROUND

In recent years, as one of the technologies for performing machine learning at high speed, an optimization technology for calculation precision has been attracting attention. A 32-bit floating point is generally used for machine learning calculations, but there are many cases in which smaller bits are sufficient for problem solving using machine learning. By calculating with a smaller number of bits, advantages such as faster computation, improved power performance, and memory resource savings are achieved.

Japanese Laid-open Patent Publication No. 2017-156941, Japanese Laid-open Patent Publication No. 2019-32833, and Japanese Laid-open Patent Publication No. 2019-79535 are disclosed as related art.

SUMMARY

According to an aspect of the embodiments, a non-transitory computer-readable recording medium stores therein a learning program for causing a computer to execute a process comprising: referring to, at time of learning a computation model that is a target of deep learning and has a plurality of nodes, a storage unit in which route information that indicates a calculation route followed by a tensor in each stage of learning prior to the time of learning, and statistical information regarding a position of a decimal point used in the calculation route are associated with each other; acquiring, when executing each piece of calculation processing set in each of the plurality of nodes at the time of learning, the statistical information corresponding to the route information that reaches each of the plurality of nodes; and executing the each piece of calculation processing using the position of the decimal point specified by the acquired statistical information.

The object and advantages of the invention will be realized and attained by means of the elements and combinations particularly pointed out in the claims.

It is to be understood that both the foregoing general description and the following detailed description are exemplary and explanatory and are not restrictive of the invention.

According to one embodiment the position of the fixed point may be adjusted suitably and a decrease in learning accuracy may be suppressed.

BRIEF DESCRIPTION OF DRAWINGS

FIG. 4 is a diagram illustrating an example of statistical information;

DESCRIPTION OF EMBODIMENTS

Figure 1:
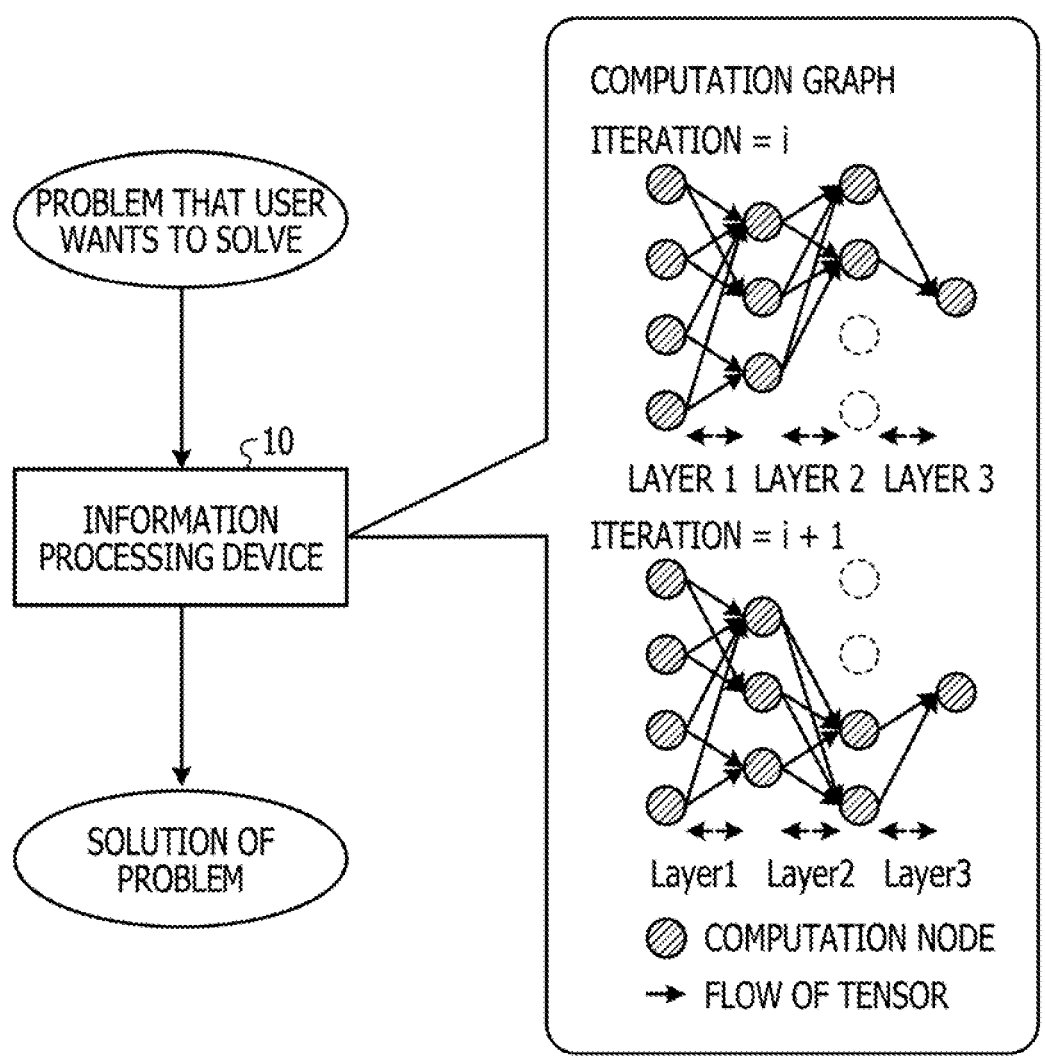
FIG. 1 is a diagram explaining an information processing device according to a first embodiment.

Currently, many companies are working on the development and application of optimization technology for calculation precision, and for example, a technology using 8-bit or 16-bit floating point on a graphics processing unit (GPU) to perform calculation with a smaller number of bits is known. Furthermore, there is also known a technology of performing inference using 8-bit integers by a tensor processing unit (TPU), which is a processor specialized for tensor calculation.

Against such a background, there has been proposed a processor that causes the fixed point to fluctuate in line with the stage of learning and performs calculation with optimum precision. This processor is designed especially for deep learning in machine learning, and as learning in deep learning progresses, optimizes the calculation precision using "the property that the fluctuation of numerical values to be calculated between iterations becomes smaller" and "the property that the distribution of values held by the tensors becomes narrower".

In the former half of learning where the fluctuations of numerical values between iterations and the variance of values held by the tensors are larger (hereinafter sometimes referred to as "pre-learning"), learning is performed using the conventional 32-bit floating point, and in the middle stage to the latter half (hereinafter sometimes referred to as "main learning") where the variance becomes smaller, learning is performed using an 8-bit fixed point (hereinafter sometimes referred to as "DLINT") whose decimal point position is variable. At this time, by adjusting the decimal point position of the fixed point as needed, sufficient precision is attained even with eight bits. Here, in order to adjust the decimal point position, it is expected to know in advance information regarding the data distribution of input tensors and output tensors (hereinafter sometimes referred to as "statistical information"), but statistical information on the actual output is not found until the calculation is performed. For this reason, there is known a technology of performing learning using statistical information on the output of corresponding calculation of iterations before the current iteration, instead of the decimal point position of the current iteration.

Meanwhile, in the above technology, in order to use the information on the previous iterations in the current iteration, it is expected to store the statistical information on each tensor used in the calculation in a memory and refer to corresponding statistical information from a database during the calculation. Here, in order to refer to the statistical information on the previous iterations, it is expected to refer to statistical information corresponding to the output of calculation that is the current execution target. However, in a case where a computation graph corresponding to a model to be subjected to machine learning dynamically changes during learning, if the calculation route followed by the tensor is changed because the computation graph changes, the calculation route may not be detected by calculation nodes after the change, and the same statistical information as the statistical information before the change will be referred to. As a result, the calculation is performed at the wrong decimal point position, such that the learning is not established, and the learning accuracy decreases.

In one aspect, a learning program and a learning method capable of suppressing a decrease in learning accuracy by adjusting the position of the fixed point suitably may be provided.

Hereinafter, embodiments will be described of a learning program and a learning method disclosed in the present application in detail with reference to the drawings. Note that the present embodiments are not limited to the examples. Furthermore, each embodiment may be appropriately combined within a range without contradiction.

First Embodiment

[Description of Information Processing Device]

An information processing device 10 according to a first embodiment is an example of a computer that executes model building for machine learning using a machine learning framework that provides functions such as deep learning. Two techniques, namely, "Define and Run (static computation graph)" and "Define by Run (dynamic computation graph)" are used to build a computation model (neural network) used in the machine learning model.

In "Define and Run", the structure of the computation graph does not change once the framework enters the calculation phase because the computation graph is defined independently of the calculation. On the other hand, in "Define by Run", the definition and calculation of the computation model are executed every time learning is performed, and the computation model dynamically changes. With either technique, the former half of learning (pre-learning) has larger fluctuations of numerical values between iterations and larger variance of values held by the tensors, such that learning is performed using the 32-bit floating point; in the latter half of learning (main learning), the optimization of calculation processing is implemented by performing learning using the 8-bit fixed point (DLINT) whose decimal point position is variable.

In the first embodiment, "Define by Run (dynamic computation graph)" will be described as an example in which specifying the decimal point position is complex and making adjustments is more difficult in the latter half of learning. FIG. 1 is a diagram explaining the information processing device 10 according to the first embodiment. As illustrated in FIG. 1, upon receiving an input of a problem that a user wants to solve, the information processing device 10 defines a computation model for deriving a solution and learns the defined computation model to derive a solution of the problem.

The example of the computation model illustrated in FIG. 1 indicates a structure in which the graph structure is changed between an iteration=i and an iteration=i+1. Generally, when statistical information is managed in association with each node that can be specified by "computation graph structure information" and calculation is performed in each node of the computation graph, learning is performed using statistical information on the output of corresponding calculation of iterations before the current iteration, Instead of the decimal point position of the current iteration.

Here, in "Define and Run", since the structure of the computation graph is not changed, for any iteration, statistical information used in the corresponding node in iterations before the any iteration may be properly acquired to execute the calculation. However, in "Define by Run", the structure of the computation graph is changed from time to time during the learning stage, and therefore the corresponding node in prior iterations may not be specified. For example, in the case of Layer 1 in FIG. 1, since all tensors take the same route between the Iteration=i and the iteration=i+1, the same statistical information is referred to. On the other hand, Layer 2 and Layer 3 take different routes between the iteration=i and the iteration=i+1, and therefore different types of statistical information are supposed to be referred to; however, even if Layer 2 in the iteration=i is referred to from Layer 2 in the iteration=i+1, the statistical information may not be acquired because the node arrangement is different.

Thus, the information processing device 10 according to the first embodiment does not generate a key for referring to statistical information from "computation graph structure information", but generates a key that refers to statistical information from "calculation route followed by tensor". For example, the information processing device 10 generates a mechanism that allows a computation model to be defined by hash values of input and output tensors, and the like, and implements a mechanism that enables calculation without considering "calculation route followed by tensor". For example, the information processing device 10 acquires statistical information on the bit distribution of calculation results in each stage of learning, and dynamically generates a key on the basis of the calculation route followed by the tensor to manage the statistical information.

For example, in each node, the information processing device 10 acquires statistical information on the input from a key held by a flowing input tensor to compute a hash value (route hash value) from the key and the content of the calculation using a hash function, and manages the computed hash value and the statistical information in association with each other. By managing in this manner, the statistical information may be referred to based on the hash value specified by the route or the calculation type regardless of the graph structure; consequently, statistical information on iterations before the current iteration may be acquired properly, and the position of the fixed point may be adjusted suitably to suppress a decrease in learning accuracy.

(Usage Scene)

Figure 2:
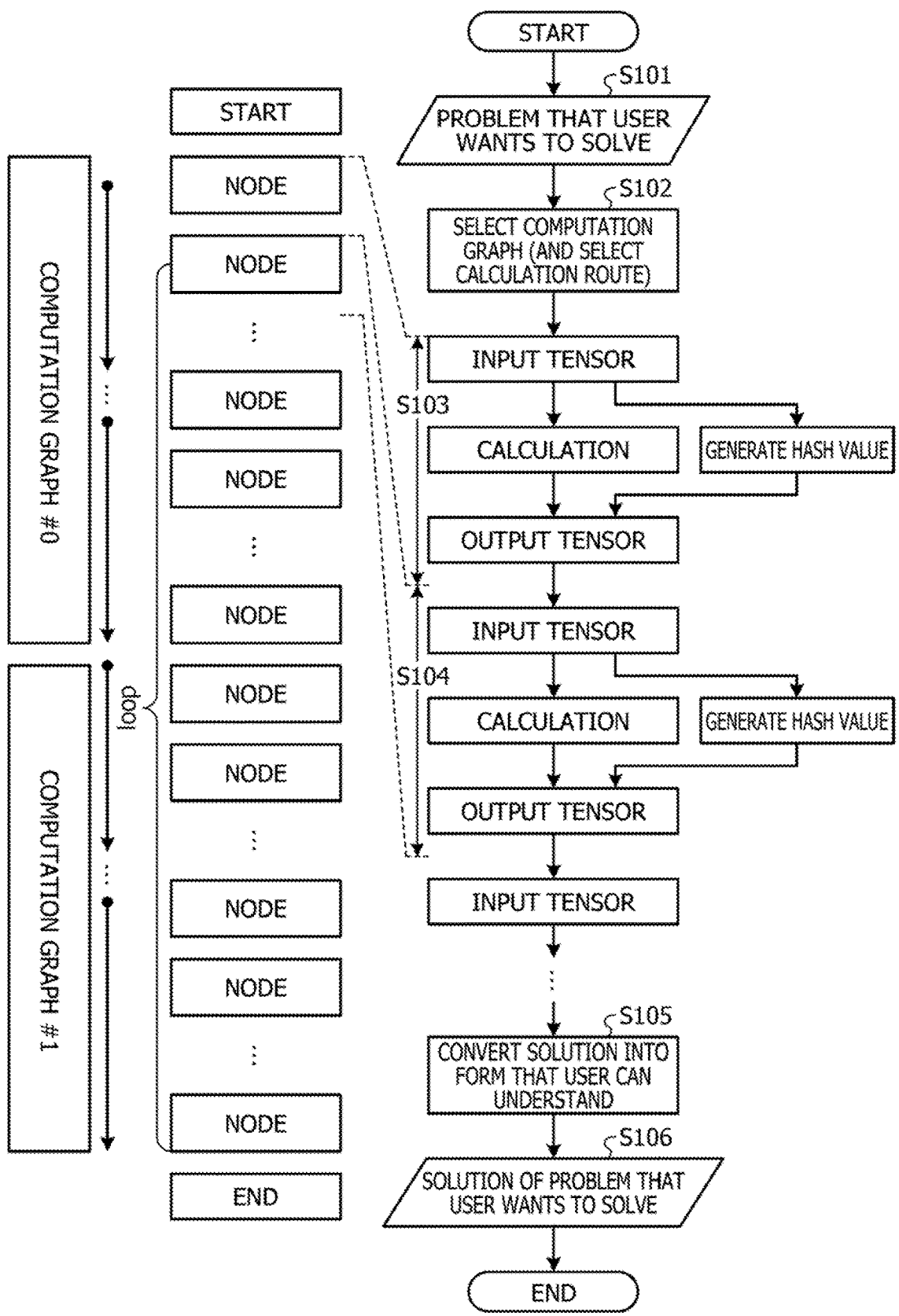
FIG. 2 is a flowchart illustrating a flow of a usage scene of a user according to the first embodiment.

Next, a flow when a user performs learning of a computation model using the information processing device 10 will be described. FIG. 2 is a flowchart illustrating a flow of a usage scene of the user according to the first embodiment. As illustrated in FIG. 2, when the user inputs information regarding a problem that the user wants to solve into the information processing device 10 (S101), the information processing device 10 uses a general machine learning algorithm to select the computation graph and the calculation route from the information that has been input (S102).

Subsequently, the information processing device 10 executes calculation processing in each node (S103 and S104). For example, the information processing device 10 uses information on the input tensor to execute calculation processing set in the node while generating a hash value, and outputs the calculation result and the hash value to the next node, as an output tensor.

Thereafter, when the learning is completed and the structure of the computation model is finalized, the information processing device 10 converts the solution into a form that the user can understand (S105), and outputs the solution of the problem that the user wants to solve to a display, a storage unit, a user terminal, or the like (S106). As described above, the user does not have to define the reference to the statistical information and the like by taking the structure of the computation model and the like into account, and thus may acquire a more proper solution than the conventional approach with the same load as the conventional approach.

[Functional Configuration]

Figure 3:
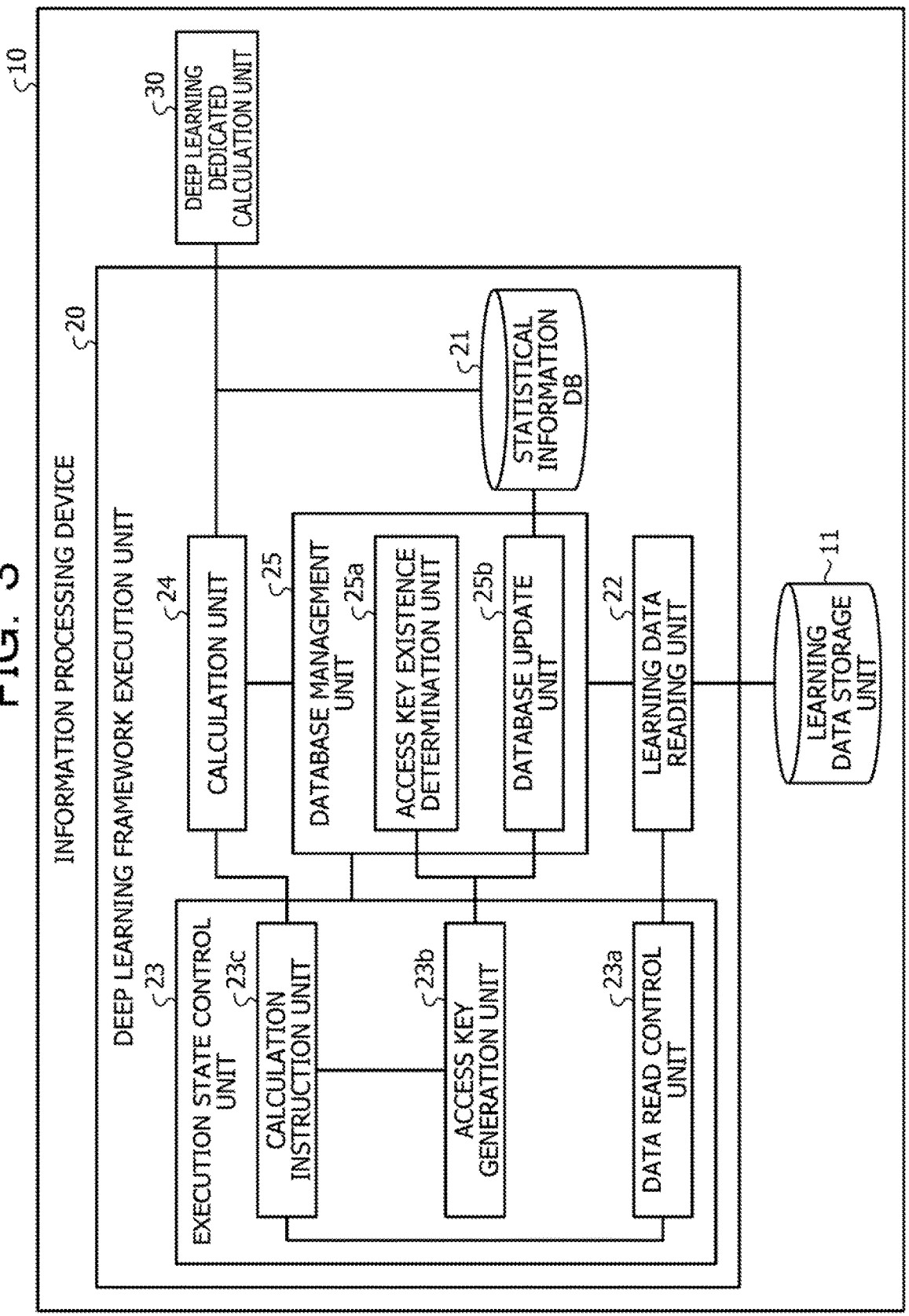
FIG. 3 is a functional block diagram illustrating a functional configuration of the information processing device according to the first embodiment.

FIG. 3 is a functional block diagram illustrating a functional configuration of the information processing device 10 according to the first embodiment. As illustrated in FIG. 3, the information processing device 10 includes a learning data storage unit 11, a deep learning framework execution unit 20, and a deep learning dedicated calculation unit 30.

The learning data storage unit 11 is a database or the like that stores learning data (training data) used for learning a computation model corresponding to the learning model. For example, the learning data storage unit 11 stores learning data in which correct answer information such as a teacher label is associated with data input to the computation model. Note that the learning data may be freely set according to a problem that the user wants to solve and the learning content. Furthermore, the learning data storage unit 11 is stored in a hard disk or the like.

The deep learning framework execution unit 20 is a processing unit that provides various functions such as deep learning. For example, the deep learning framework execution unit 20 is a processing unit that builds and learns a computation model according to a user's input, and executes deep learning including dynamic modification of the structure of the computation model according to the learning, and the like to generate a solution of a problem that the user wants to solve.

This deep learning framework execution unit 20 includes a statistical information DB 21, a learning data reading unit 22, an execution state control unit 23, a calculation unit 24, and a database management unit 25. Note that the deep learning framework execution unit 20 is a processing unit executed by a processor such as a central processing unit (CPU) or the like, and is an example of an electronic circuit included in the CPU or an example of a process executed by the CPU.

The statistical information DB 21 represents information on the distribution range of data held by the tensors, and is information used to select the number of significant digits when performing DLINT calculation. FIG. 4 is a diagram illustrating an example of statistical information. As illustrated in FIG. 4, the statistical information DB 21 is a database that stores information in which "Key" and "statistical information storage address" are associated with each other, and is stored in a memory or the like. Here, "Key" is a hash value generated using information on the input tensor and the like, and is information that specifies the calculation route followed by the tensor. "Statistical information storage address" is information indicating a position in a memory or the like where the statistical information is stored. FIG. 4 indicates that statistical information corresponding to a calculation route specified by "hash1" is stored in "0x00000001" in the memory. Note that the whole statistical information may also be stored instead of "statistical information storage address".

The learning data reading unit 22 is a processing unit that reads learning data from the learning data storage unit 11 and outputs the read learning data to various processing units. For example, the learning data reading unit 22 reads learning data and outputs the read learning data to the execution state control unit 23 until the learning ends. The timing to end the learning may be freely set, such as a time point when the learning using all items of the learning data is completed, a time point when the learning using a predetermined number or more of items of learning data is completed, or a time point when the restoration error falls under a threshold value.

The execution state control unit 23 is a processing unit that includes a data read control unit 23a, an access key generation unit 23b, and a calculation instruction unit 23c, and controls the execution state of the computation model and each node included in the computation model. For example, the execution state control unit 23 executes dynamic modification of the structure of the computation model (the arrangement of nodes and calculation content), and the like according to the calculation result of the computation model for the learning data.

The data read control unit 23a is a processing unit that executes reading of various types of data. For example, the data read control unit 23a inputs the learning data acquired by the learning data reading unit 22 into the computation model. Furthermore, the data read control unit 23a acquires, for example, the key (hash value) of the input tensor, and the calculation type, a calculation parameter, and the like of the computation node, as various types of information for generating a key corresponding to each computation node constituting the computation model (hereinafter sometimes simply referred to as node), and outputs the acquired items to the access key generation unit 23b and the like. In addition, the data read control unit 23a acquires the calculation type, the calculation parameter, and the like of the computation node and outputs the acquired items to the calculation instruction unit 23c.

The access key generation unit 23b is a processing unit that generates a key used for the acquisition of statistical information and the like. For example, the access key generation unit 23b works out the key (hash value) of the computation node using the key (hash value) of the input tensor, and the calculation type, the calculation parameter, and the like of the computation node, which have been acquired by the data read control unit 23a. Then, the access key generation unit 23b outputs the worked-out key to the calculation instruction unit 23c and the database management unit 25.

The calculation instruction unit 23c is a processing unit that outputs information used for the calculation executed by the computation node. For example, the calculation instruction unit 23c outputs, to the calculation unit 24, the calculation type and the calculation parameter of the computation node notified from the data read control unit 23a, and the key output from the access key generation unit 23b.

The calculation unit 24 is a processing unit that executes preprocessing of calculation for machine learning, memory control relating to the calculation, and the like. For example, in the case of pre-learning in the former half of learning, the calculation unit 24 outputs the calculation type and the calculation parameter of the computation node to the deep learning dedicated calculation unit 30, and requests 32-bit floating point calculation (FLOAT calculation).

Furthermore, in the case of the main learning in the latter half of learning, the calculation unit 24 acquires a statistical information storage address corresponding to the key acquired from the access key generation unit 23b, from statistical information 12, and acquires statistical information stored at the acquired statistical information storage address from the memory. Then, the calculation unit 24 specifies the decimal point position of the calculation in accordance with the statistical information. Thereafter, the calculation unit 24 outputs the calculation type and the calculation parameter of the computation node and the decimal point position to the deep learning dedicated calculation unit 30, and requests the DLINT calculation. Note that distinguishing between the former half of learning and the latter half of learning may be freely set, such as the time since the start of learning, whether or not the number of times of learning exceeds a threshold value, or a time point when the restoration error falls under a threshold value.

The database management unit 25 is a processing unit that includes an access key existence determination unit 25a and a database update unit 25b, and manages the statistical information DB 21.

The access key existence determination unit 25a is a processing unit that determines whether or not a key generated by the access key generation unit 23b is registered in the statistical information DB 21. For example, when the key is registered, the access key existence determination unit 25a acquires a statistical information storage address corresponding to the key and outputs the acquired statistical information storage address to the execution state control unit 23 and the calculation unit 24. In this case, the DLINT calculation is executed at a decimal point position specified by the statistical information.

On the other hand, when the key is not registered, the access key existence determination unit 25a outputs the fact that the statistical information storage address does not exist, to the execution state control unit 23 and the calculation unit 24. In this case, the FLOAT calculation is executed.

The database update unit 25b is a processing unit that manages updating of the statistical information DB 21. For example, when a new key is generated, the database update unit 25b associates the statistical information storage address where the statistical information is stored, with the key, and newly registers the key in the statistical information DB 21. Furthermore, when statistical information corresponding to the registered key is read, the database update unit 25b updates the statistical information DB 21 using statistical information after the calculation, after the calculation using the read statistical information is completed.

The deep learning dedicated calculation unit 30 is a processing unit that executes various calculations of computation nodes. For example, when instructed on the pre-learning, the deep learning dedicated calculation unit 30 executes 32-bit floating point calculation (FLOAT calculation) using the notified calculation type and calculation parameter of the computation node, and outputs the calculation result to the deep learning framework execution unit 20.

Furthermore, when instructed on the main learning, the deep learning dedicated calculation unit 30 executes the DLINT calculation using the notified decimal point position, using the notified calculation type and calculation parameter of the computation node, and outputs the calculation result to the deep learning framework execution unit 20. Note that the deep learning dedicated calculation unit 30 is a processing unit executed by a deep learning dedicated artificial intelligence (AI) processor (deep learning unit (DLU)) or the like, and is an example of an electronic circuit included in the DLU or an example of a process executed by the DLU.

[Processing in Node]

Next, processing executed during the calculation of each node will be described. Here, the generation of the hash value and the calculation in the node will be described.

(Generation of Hash Value)

Figure 5:
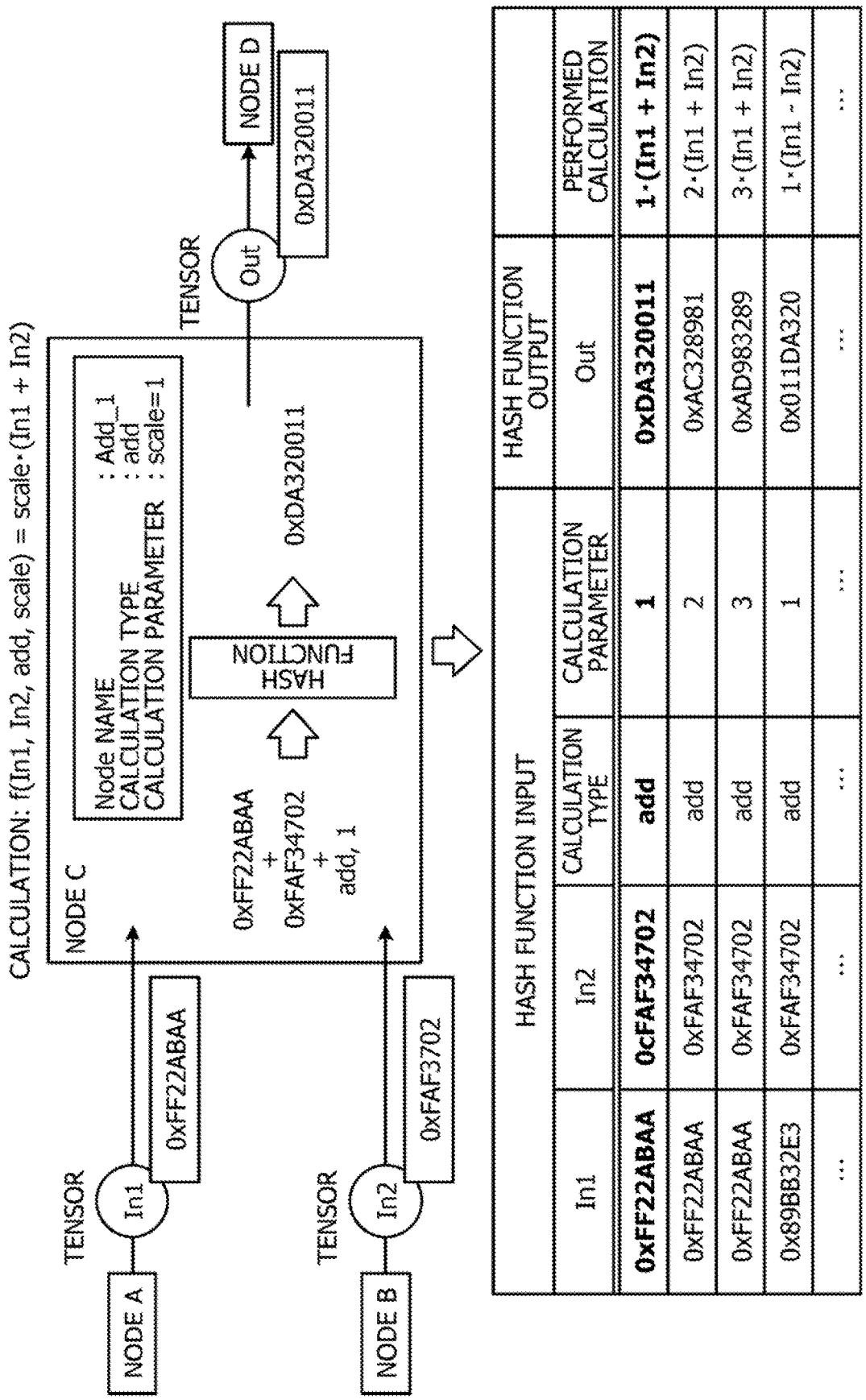
FIG. 5 is a diagram explaining the generation of a hash value in each node.

FIG. 5 is a diagram explaining the generation of the hash value in each node. In FIG. 5, an example of generating the association between the statistical information and the key for a node C will be described. In the node C (Add_1), a function f having In1, In2, add, and scale as variables is executed, and "scale·(In1+In2)" is output.

As Illustrated in FIG. 5, the deep learning framework execution unit 20 acquires the hash value In1 (0xFF22ABAA) included in the input tensor input from a node A to the node C and the hash value In2 (0xFAF34702) included in the input tensor input from a node B to the node C. Furthermore, the deep learning framework execution unit 20 acquires the calculation type (add) and the calculation parameter (scale=1) of the node C.

Then, the deep learning framework execution unit 20 inputs the hash value In1 (0xFF22ABAA), the hash value In2 (0xFAF34702), the calculation type (add), and the calculation parameter (scale=1) into the hash function, and works out a hash value (0xDA320011).

Thereafter, the deep learning framework execution unit 20 acquires statistical information using the worked-out hash value (0xDA320011) as a key, and executes calculation processing. In addition, the deep learning framework execution unit 20 updates statistical information corresponding to the worked-out hash value (0xDA320011). Then, the deep learning framework execution unit 20 outputs the worked-out hash value (0xDA320011) to a next node D. Since the hash value obtained here is unique with respect to the calculation route followed by the tensor, by associating the hash value with the statistical information used in the calculation route, nodes on the same calculation route are allowed to refer to the same statistical information even if the nodes undergo several iterations.

(Explanation of Calculation Processing)

Figure 6:
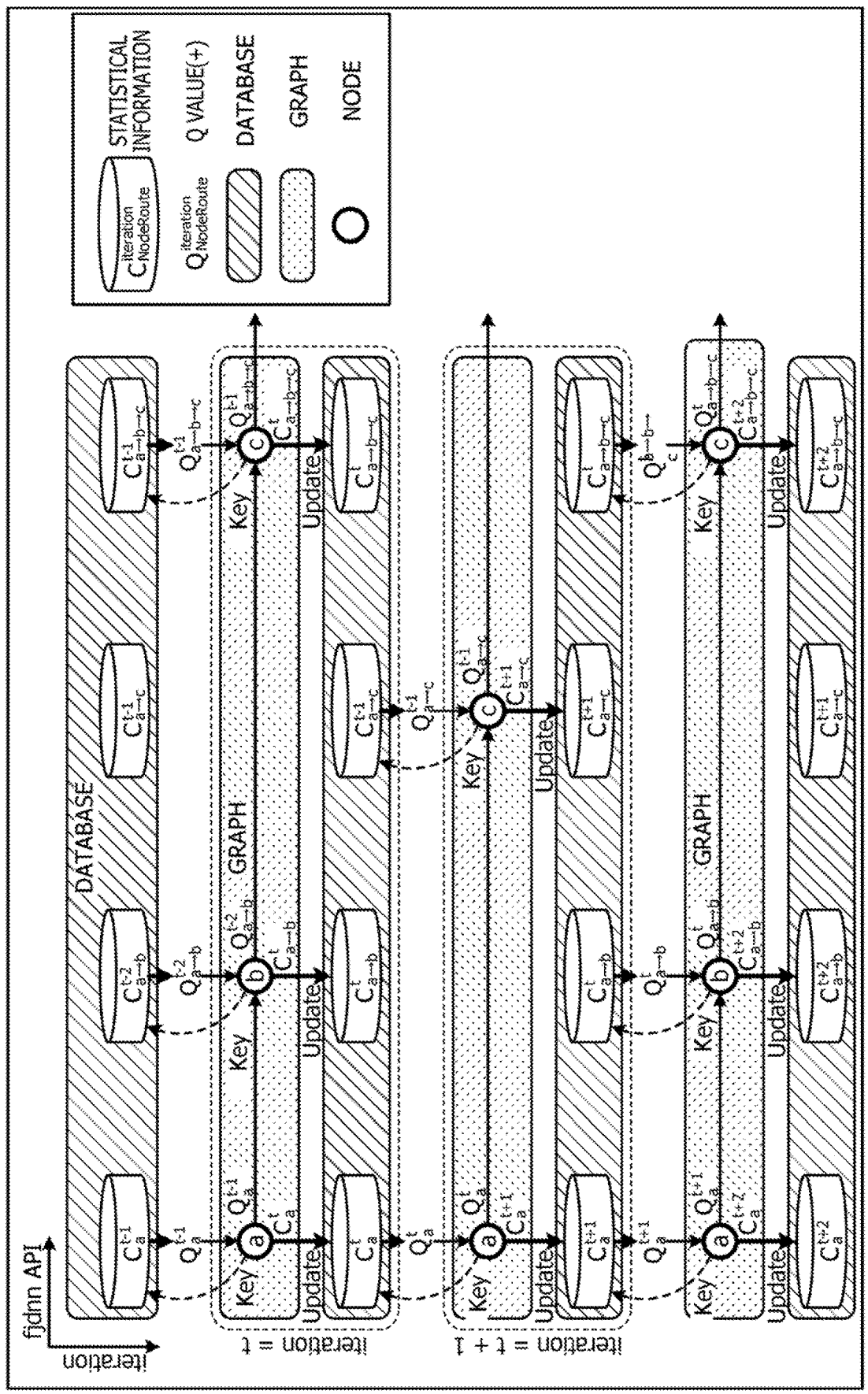
FIG. 6 is a diagram explaining calculation in each node.

FIG. 6 is a diagram explaining calculation in each node. The horizontal axis illustrated in FIG. 6 denotes the calculation direction of the computation graph, and the vertical axis denotes the iteration direction. In FIG. 6, a description will be given of a series of flows in which a Q value used in the output tensor is acquired from information on the input tensor and the DLINT calculation is performed in each node. Note that the Q value is a value found out from the statistical information and is used to select the decimal point position of the DLINT calculation.

As illustrated in FIG. 6, in an iteration=t, a computation graph in which the calculation is performed in the order of a node A, a node B, and a node C is generated. In the node A, the worked-out key (hash value) is used to acquire statistical information $C_a^{t-1}$ generated in the immediately previous iteration, and the DLINT calculation is performed using $Q_a^{t-1}$ obtained from the statistical information; then, the statistical information $C_a^{t-1}$ is updated to statistical information $C_a^{t-1}$. Next, in the node B, the worked-out key is used to acquire statistical information $C_{a\to b}^{t-2}$ generated in an iteration preceding by two iterations, and the DLINT calculation is performed using $Q_{a\to b}^{t-2}$ obtained from the statistical information; then, the statistical information $C_{a\to b}^{t-2}$ is updated to statistical information $C_{a\to b}^{t}$. Furthermore, in the node C, the worked-out key is used to acquire statistical information $C_{a\to b\to c}^{t-1}$ generated in the immediately previous iteration, and the DLINT calculation is performed using $Q_{a\to b\to c}^{t-1}$ obtained from the statistical information; then, the statistical information $C_{a\to b\to c}^{t-1}$ is updated to statistical information $C_{a\to b\to c}^{-1}$.

In the next iteration=t+1, a computation graph in which the calculation is performed in the order of the node A and the node C is generated. Note that the node C in the iteration=t+1 has a calculation route that comes from the node A, and therefore, is a node executed on a different calculation route from the calculation route of the node C in the iteration=t. In the node A, the worked-out key is used to acquire statistical information $C_a^{t}$ generated in the immediately previous iteration, and the DLINT calculation is performed using $Q_a^{t}$ obtained from the statistical information; then, the statistical information $C_a^{t}$ is updated to statistical information $C_a^{t+1}$. Furthermore, in the node C, the worked-out key is used to acquire statistical information $C_{a\to c}^{t-1}$ generated in an iteration preceding by two iterations with the same graph structure, rather than the immediately previous iteration with a different graph structure, and the calculation is performed using $Q_{a\to c}^{t-1}$ obtained from the statistical information; then, the statistical information $C_{a\to c}^{t-1}$ is updated to statistical information $C_{a\to c}^{t+1}$.

Note that, in the next iteration=t+2, a computation graph in which the calculation is performed in the same order as the iteration=t preceding by two iterations, that is, the node A, the node B, and the node C, is generated; therefore, the DLINT calculation using the statistical information used in the Iteration=t preceding by two iterations is executed in each node using the hash value. However, since the node A is positioned at the head of the computation graph as in the immediately previous iteration=t+1, the statistical information used in the immediately previous iteration=t+1, rather than the iteration=t preceding by two iterations, is acquired.

[Flow of Processing]

Figure 7:
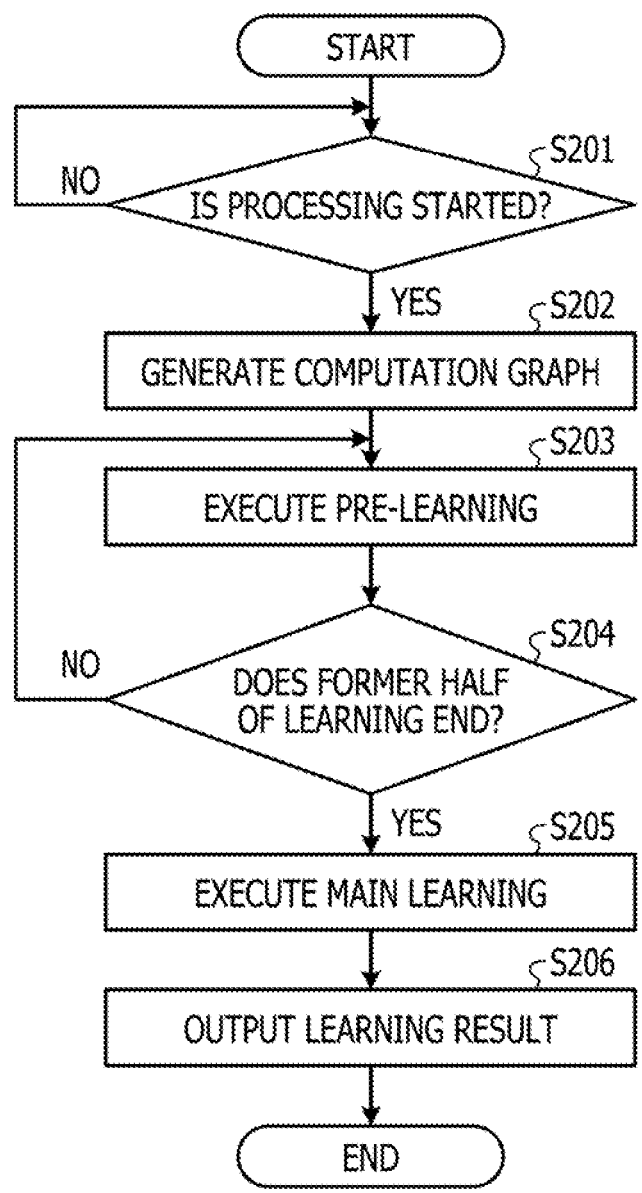
FIG. 7 is a flowchart illustrating an overall flow of learning processing according to the first embodiment.

Next, each type of processing executed by the information processing device 10 will be described. First, the overall flow will be described, and then the detailed flow will be described. FIG. 7 is a flowchart illustrating an overall flow of learning processing according to the first embodiment.

As illustrated in FIG. 7, when instructed on the processing by an administrator or the like (S201: Yes), the information processing device 10 generates a computation model corresponding to a problem that the user wants to solve and has designated (S202). Note that, as a technique of generating the computation model, a technique similar to a general deep learning framework may be adopted.

Subsequently, the information processing device 10 executes the pre-learning to execute the learning of the computation graph (learning model) (S203), and repeats the pre-learning until the former half of learning ends (S204: No).

On the other hand, when the former half of learning ends (S204: Yes), the information processing device 10 executes the main learning (DLINT) to execute the learning of the computation graph (S205), and outputs the learning result when the learning ends (S206).

(Basic Flow in Node)

Figure 8:
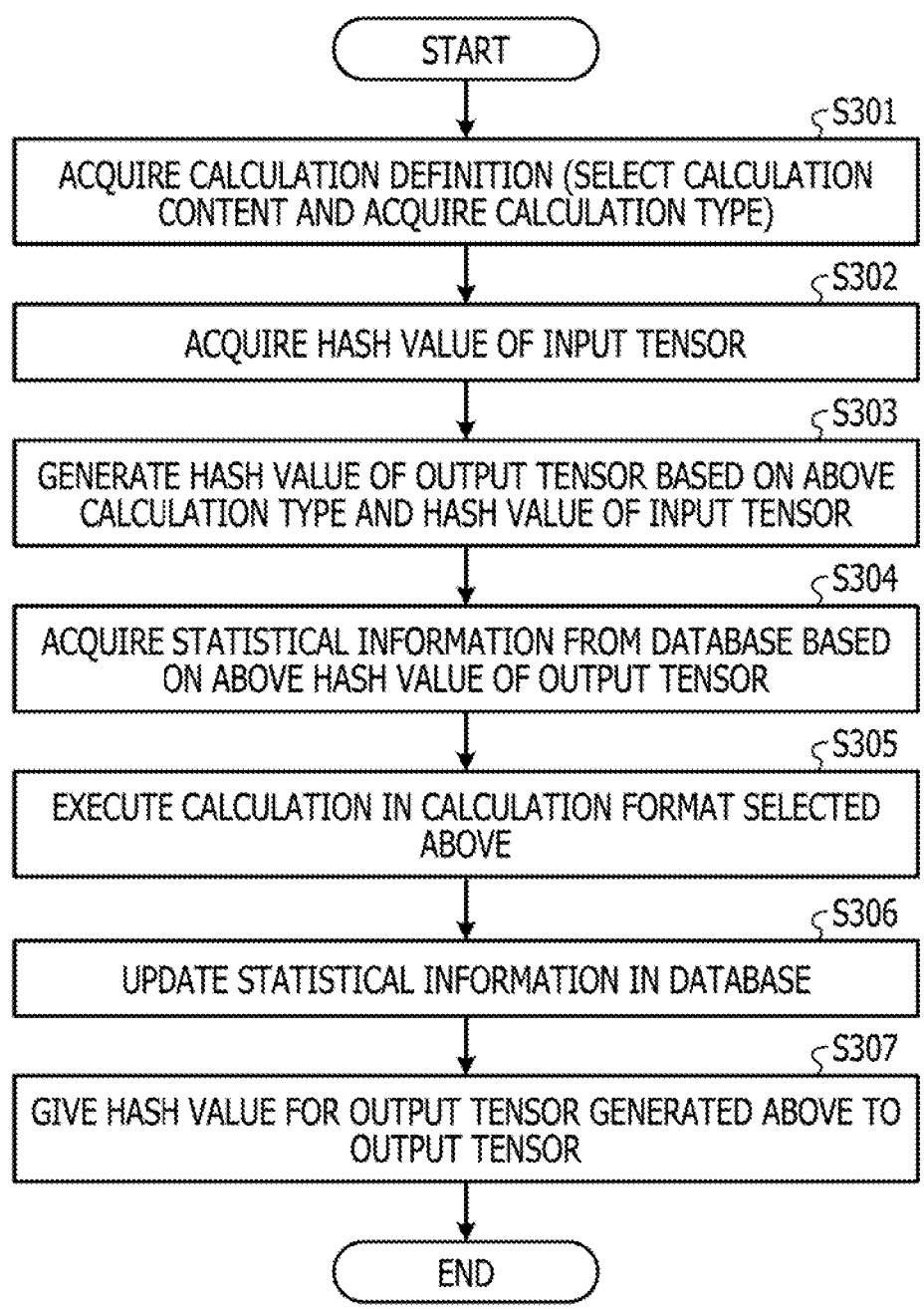
FIG. 8 is a flowchart illustrating a basic flow of processing executed in the node according to the first embodiment.

FIG. 8 is a flowchart illustrating a basic flow of processing executed in the node according to the first embodiment. As illustrated in FIG. 8, the deep learning framework execution unit 20 acquires a calculation definition by which the selection of the calculation content, the acquisition of the calculation type, and the like set in the corresponding node are performed (S301).

Subsequently, the deep learning framework execution unit 20 acquires the hash value of the input tensor (S302), and generates the hash value of the output tensor based on the calculation type, the hash value of the input tensor, and the like (S303).

Then, the deep learning framework execution unit 20 acquires corresponding statistical information from the statistical information DB 21 based on the hash value of the output tensor (S304), and executes the calculation (S305). At this time, the deep learning framework execution unit 20 executes the learning using the 32-bit floating point at the timing of the pre-learning, and executes the learning by the DLINT calculation at the decimal point position in accordance with the statistical information at the timing of the main learning.

Thereafter, the deep learning framework execution unit 20 updates the statistical information (S306), and gives the hash value for the output tensor generated above to the output tensor to output the output tensor (S307).

(Processing of Each Node)

Figure 9:
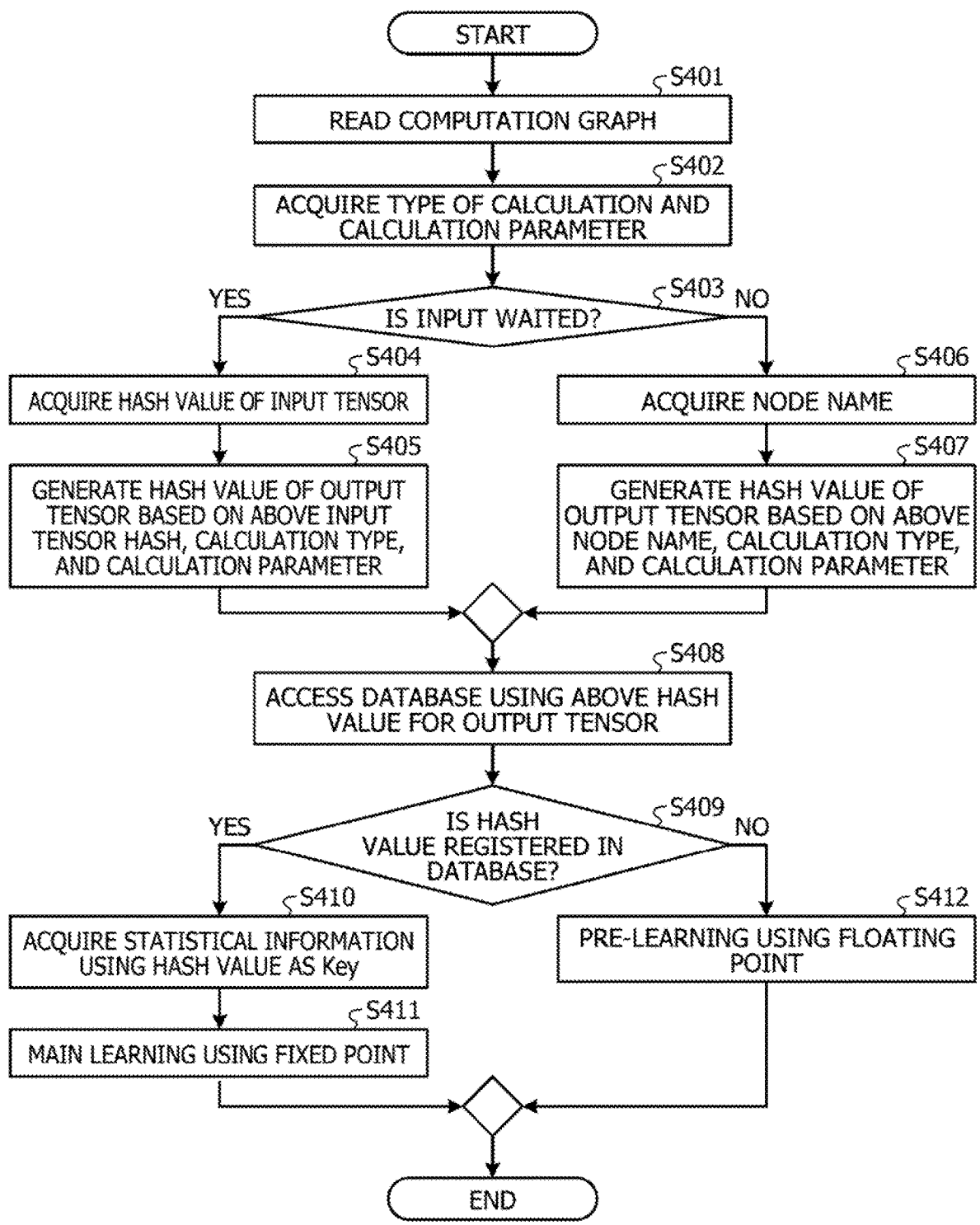
FIG. 9 is a flowchart illustrating a flow of processing executed by each node according to the first embodiment.

FIG. 9 is a flowchart illustrating a flow of processing executed by each node according to the first embodiment. As illustrated in FIG. 9, when reading the computation graph (S401), the deep learning framework execution unit 20 acquires the type of calculation and the calculation parameter set in a node to be processed (S402).

Subsequently, when the node to be processed corresponds to a node that waits for an input (S403: Yes), the deep learning framework execution unit 20 acquires the hash value of the input tensor (S404), and generates the hash value of the output tensor based on the hash value of the input tensor, the calculation type, and the calculation parameter (S405).

On the other hand, when the node to be processed does not correspond to a node that waits for an input (403: No), the deep learning framework execution unit 20 acquires the node name (S406), and generates the hash value of the output tensor based on the node name, the calculation type, and the calculation parameter (S407).

Thereafter, the deep learning framework execution unit 20 accesses the statistical information DB 21 using the above hash value for the output tensor (S408), and determines whether or not the hash value is registered (S409).

Then, when the hash value is registered (S409: Yes), the deep learning framework execution unit 20 acquires statistical information using the hash value as a key (410), and executes the main learning using the fixed point at a decimal point position based on the acquired statistical information (411).

On the other hand, when the hash value is not registered (S409: No), the deep learning framework execution unit 20 executes the pre-learning using the floating point (S412). Note that, even if the hash value is registered, the pre-learning by the FLOAT calculation may be executed in the former half of learning.

(Calculation Processing)

Figure 10:
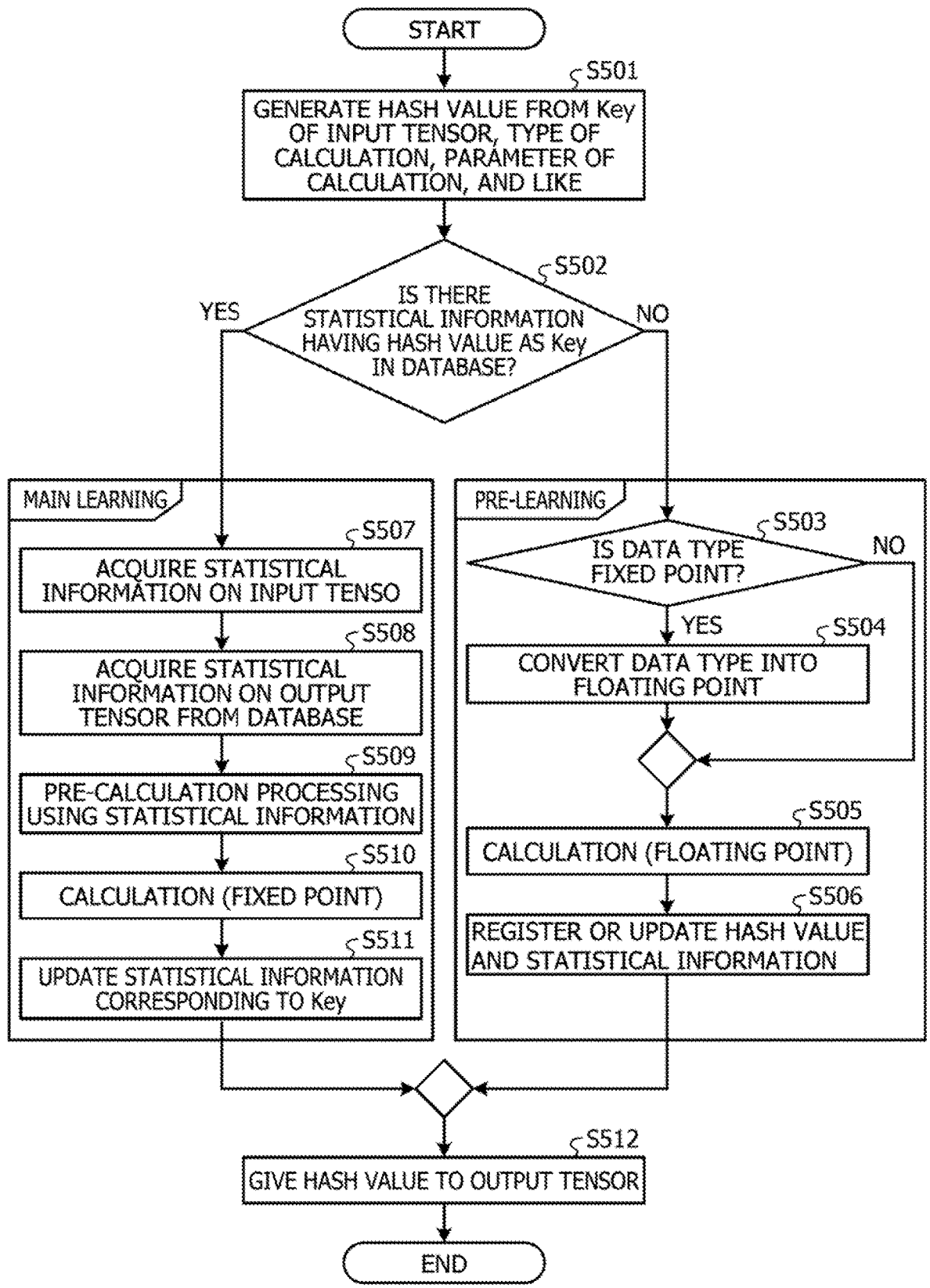
FIG. 10 is a flowchart illustrating a flow of calculation processing in each node according to the first embodiment.

FIG. 10 is a flowchart illustrating a flow of calculation processing in each node according to the first embodiment. As illustrated in FIG. 10, the deep learning framework execution unit 20 generates a hash value from the key of the input tensor, the type of calculation, the calculation parameter, and the like (S501). Then, the deep learning framework execution unit 20 determines whether or not the statistical information having the hash value as a key is registered in the statistical information DB 21 (S502).

Here, when the statistical information is not registered (S502: No), the deep learning framework execution unit 20 determines whether or not the data type of the processing is the fixed point (S503). Then, when the data type of the processing is the fixed point (S503: Yes), the deep learning framework execution unit 20 converts the data type into the floating point (S504).

Thereafter, the deep learning framework execution unit 20 executes the floating point calculation (S505), and associates the hash value with the statistical information to register the statistical information in or update the statistical information DB 21 (S506).

On the other hand, when the statistical information is registered (S502: Yes), the deep learning framework execution unit 20 acquires the statistical information on the input tensor (S507), and acquires the statistical information on the output tensor from the statistical information DB 21 (S508).

Then, the deep learning framework execution unit 20 executes general preprocessing of machine learning using the statistical information, such as memory control (S509), and executes the fixed point calculation (S510). Thereafter, the deep learning framework execution unit 20 updates statistical information corresponding to the key in the statistical information DB 21 (S511). Thereafter, the deep learning framework execution unit 20 gives a hash value to the output tensor (S512).

(Detailed Processing of Node)

Figure 11:
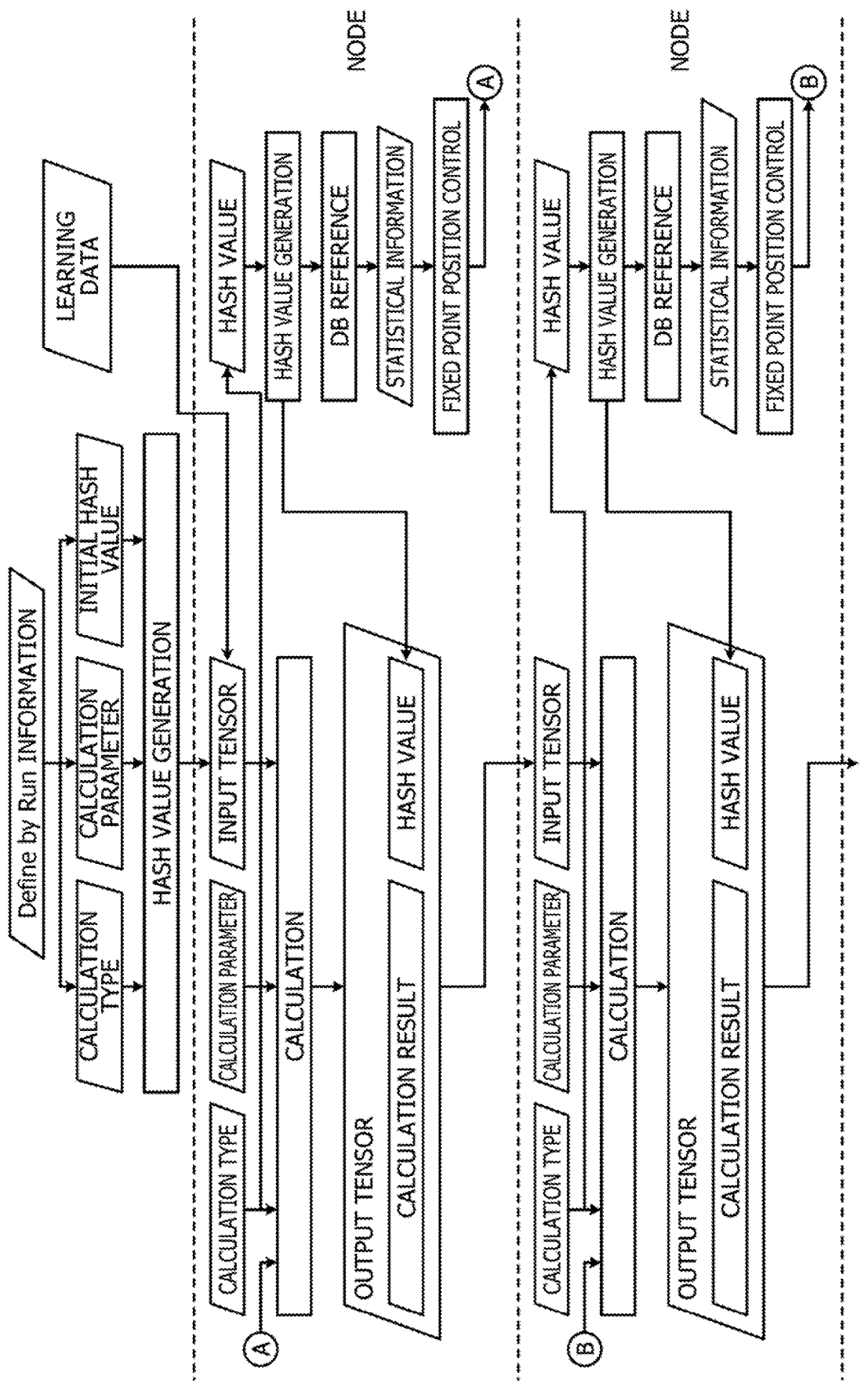
FIG. 11 is a flowchart illustrating a detailed flow of processing of each node according to the first embodiment.

FIG. 11 is a flowchart illustrating a detailed flow of processing of each node according to the first embodiment. Here, the main learning in which the DLINT calculation is performed will be described.

As illustrated in FIG. 11, the calculation type, the calculation parameter, and the initial hash value are acquired from definition information by "Define by Run", and a hash value is generated using these items of information.

Then, in the head node, the generated hash value and learning data are input as an input tensor, and a new hash value is generated based on the calculation type and the calculation parameter of the head node and the input tensor. Subsequently, statistical information corresponding to the generated hash value is acquired and the fixed point position is selected. Thereafter, the DLINT calculation based on the calculation type and the calculation parameter of the head node, the input tensor, and the fixed point position is executed, and the output tensor including the calculation result and the hash value is output to the next node.

In each node subsequent to the head node, the output tensor of the previous node is input as an input tensor, and a new hash value is generated based on the calculation type and the calculation parameter of each node and the input tensor. Subsequently, statistical information corresponding to the generated hash value is acquired and the fixed point position is selected. Thereafter, the DLINT calculation based on the calculation type and the calculation parameter of the node, the input tensor, and the fixed point position is executed, and the output tensor including the calculation result and the hash value is output to the next node.

In this manner, each node generates a hash value based on the input tensor and the calculation content, and executes the management of the generated hash value and the statistical information in association with each other.

Effects

Generally, when the graph changes dynamically, if the node has never been executed in the past, the corresponding statistical information does not exist and may not be referred to. On the other hand, the information processing device 10 may be allowed to refer to appropriate statistical information by suitably associating calculations executed in each node between iterations, and to adjust the position of the fixed point. Furthermore, the information processing device 10 may be allowed to suitably refer to the statistical information even when the computation graph or the node has changed, and to perform learning as in a case where the computation graph is not dynamically changed.

As described above, by dynamically generating a key and referring to the database of the statistical information on the basis of "calculation route followed by tensor", the information processing device 10 may be allowed to locate the corresponding statistical information from the past iterations, and to establish the DLINT calculation even when the computation graph or the node has changed during the main learning.

Figure 12:
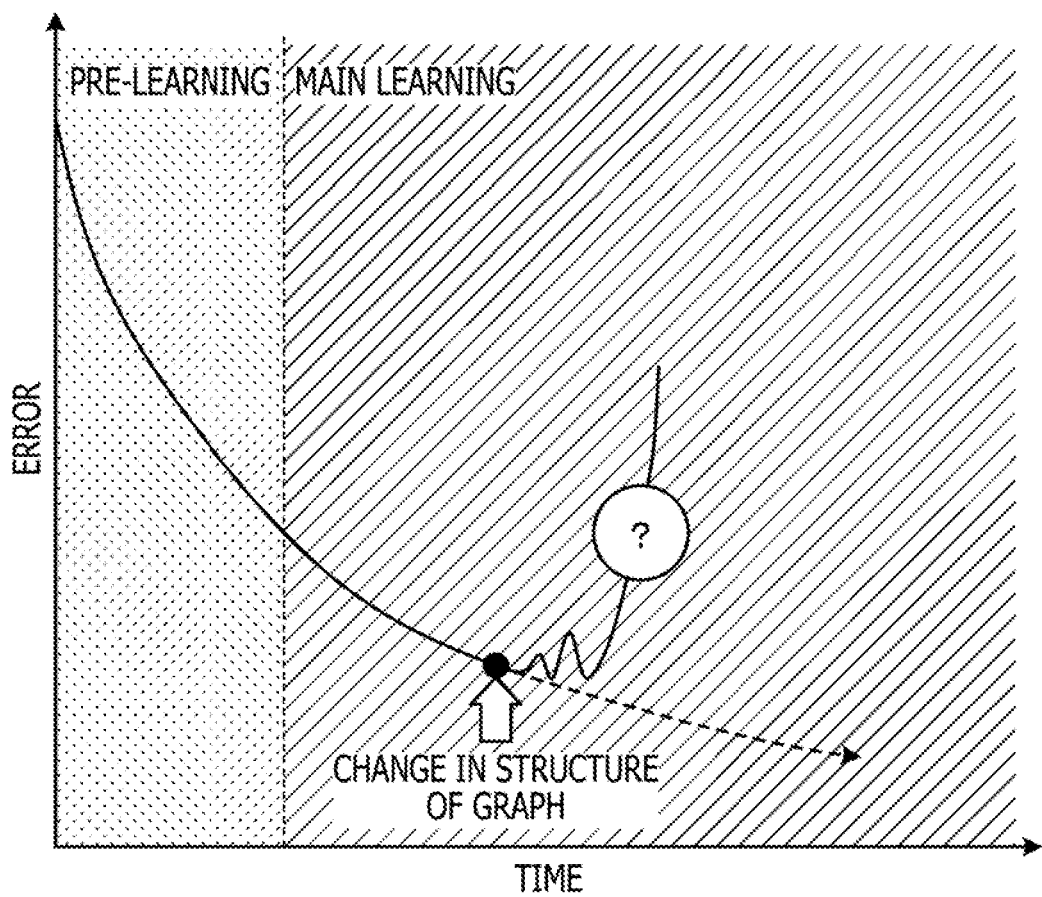
FIG. 12 is a diagram explaining an effect.

FIG. 12 is a diagram explaining an effect. As illustrated in FIG. 12, by performing the pre-learning and the main learning in sequence, the learning progresses and the error gradually becomes smaller. Here, in the general technology, when a value held by the tensor is changed significantly due to the change of the calculation route during the main learning, the change may not be detected. For this reason, in the general technology, when wrong statistical information is referred to, the decimal point position is erroneously set. For example, in an 8-bit fixed point, a maximum error of two to the power of seven=128 times is produced between seven bits excluding the sign bit, and learning fails.

On the other hand, when the route followed by the tensor has changed due to a change in the computation graph, the information processing device 10 according to the first embodiment may be allowed to detect the change during the calculation, and to refer to the statistical information when the same route was followed in the past; consequently, learning may be established and a decrease in learning accuracy may be suppressed.

Second Embodiment

Incidentally, in the first embodiment, the computation graph generated by "Define by Run" is described as an example; however, the embodiment is not limited to this example, and may also be applied to a computation model generated by "Define and Run". Thus, in a second embodiment, "Define and Run" will be described as an example.

[Computation Graph According to Second Embodiment]

In "Define and Run", the structure of the computation graph does not change once the framework enters the calculation phase because the computation graph is defined independently of the calculation. In this case, structure information on calculation is used as an access key to a database in which the statistical information is saved. For example, in the second embodiment, each calculation is strictly structured as to at what place the calculation of which node is in which computation graph, and a unique key is generated from information on this structure and linked with the statistical information, whereby the reference is enabled.

Figure 13:
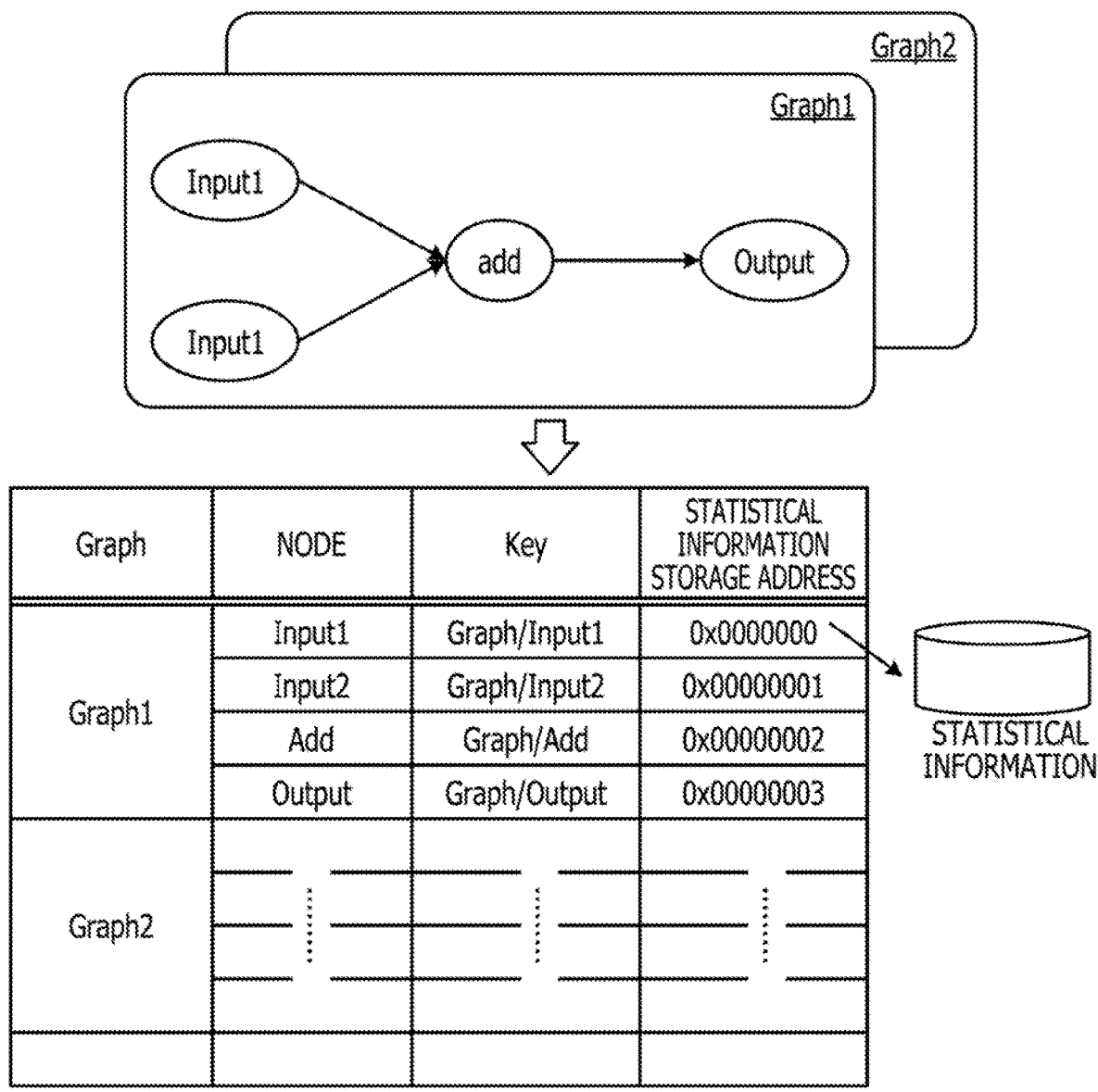
FIG. 13 is a diagram explaining a computation graph according to a second embodiment.

FIG. 13 is a diagram explaining a computation graph according to the second embodiment. FIG. 13 illustrates, as one of the computation graphs, a graph 1 (Graph1) having a structure in which Input1 and Input2 are input, and Input1 and Input2 are added (add) and output. Here, the key of a database that manages the statistical information is created by designating the output tensor of the calculation, and as a result, the key of the input tensor is created in the previous node. Then, for the statistical information on the output tensor, the key is generated from the structure information. These keys are used to acquire statistical information in the previous iteration from the database.

For example, in the second embodiment, the graph name and the node name for which the calculation is performed are used as the structure information. As illustrated in FIG. 13, for the node "Input1" of the graph (Graph1), "graph name/node name=Graph1/Input1" is generated as a key, and "0x00000000" is assigned as the storage address of the statistical information. Furthermore, for the node "Input2" of Graph1, "Graph1/Input2" is generated as a key and "0x00000001" is assigned as the storage address of the statistical information. Similarly, for the node "Add" of Graph1, a key "Graph/Add" is generated, and "0x00000002" is assigned as the storage address of the statistical information. For the node "Output" of Graph1, a key "Graph1/Output" is generated, and "0x00000003" is assigned as the storage address of the statistical information.

In this manner, a key is given to each node and a database that manages the statistical information on each node is generated. Such a database is built during the pre-learning; then, in the main learning, the statistical information is referred to on the basis of the built database, and the statistical information is updated every time the calculation is performed.

(Usage Scene)

Figure 14:
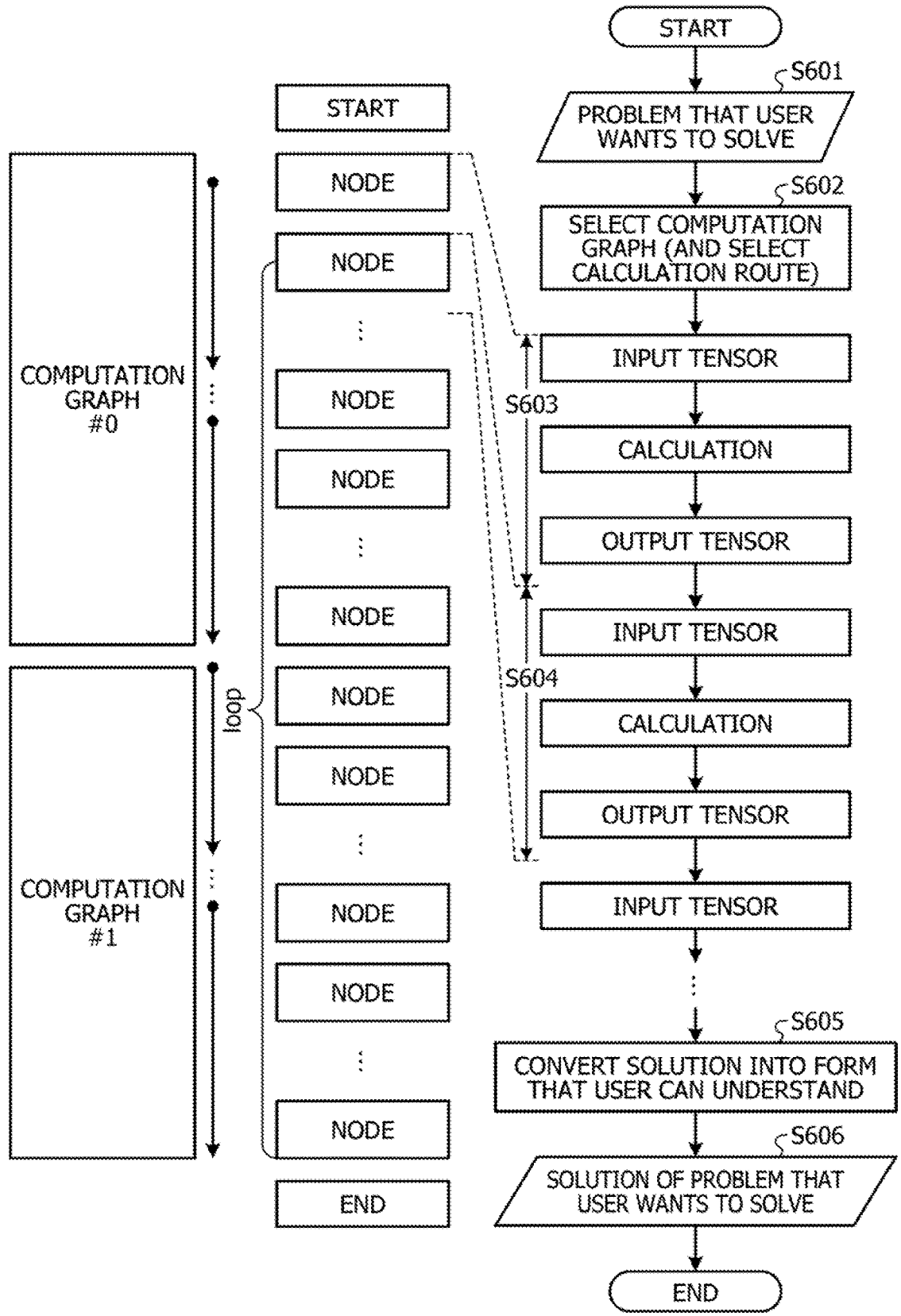
FIG. 14 is a flowchart illustrating a flow of a usage scene of a user according to the second embodiment.

Next, a flow when the user performs learning of a computation model according to the second embodiment will be described. FIG. 14 is a flowchart illustrating a flow of a usage scene of the user according to the second embodiment. As illustrated in FIG. 14, when the user inputs information regarding a problem that the user wants to solve into an information processing device 10 (S601), the information processing device 10 selects the computation graph and the calculation route from the information that has been input, based on "Define and Run" by a general machine learning algorithm (S602).

Subsequently, the information processing device 10 executes calculation processing in each node (S603 and S604). For example, in each node, the acquisition of the statistical information from the input tensor is executed, calculation processing set in the node is executed using the statistical information, and the output tensor including the calculation result is output to the next node. At this time, the statistical information may be output together with the calculation result.

Note that, in the pre-learning, a key is generated and registered in the DB in association with the statistical information for each calculation of the node. Furthermore, in the main learning, the statistical information corresponding to the generated key is read, the calculation is executed, and the DB is updated for each calculation of the node.

Thereafter, when the learning is completed and the structure of the computation model is finalized, the information processing device 10 converts the solution into a form that the user can understand (S605), and outputs the solution of the problem that the user wants to solve to a display, a storage unit, a user terminal, or the like (S606).

[Flow of Processing]

Figure 15:
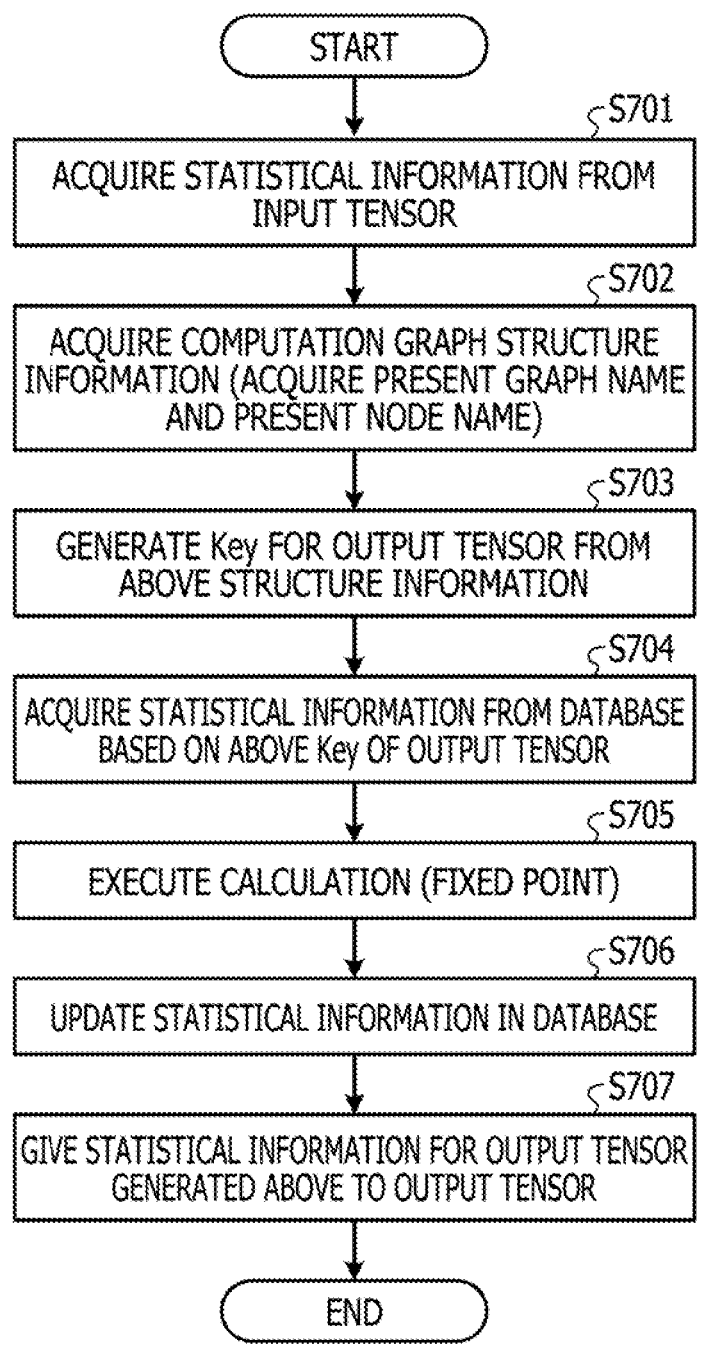
FIG. 15 is a flowchart illustrating a basic flow of processing executed in the node according to the second embodiment.

FIG. 15 is a flowchart illustrating a basic flow of processing executed in the node according to the second embodiment. As illustrated in FIG. 15, when the processing is started, a deep learning framework execution unit 20 of the information processing device 10 acquires the statistical information from the input tensor (S701), and acquires the structure information on the computation graph, such as the graph name and the node name (S702).

Subsequently, the deep learning framework execution unit 20 generates a key for the output tensor from the structure information (S703), and acquires statistical information from a statistical information DB 21 based on the key of the output tensor (S704).

Then, the deep learning framework execution unit 20 executes fixed point calculation processing using the acquired statistical information (S705), and updates the statistical information in the statistical information DB 21 (S706). Thereafter, the deep learning framework execution unit 20 gives the above statistical information for the output tensor to the output tensor, and outputs the output tensor (S707).

Figure 16:
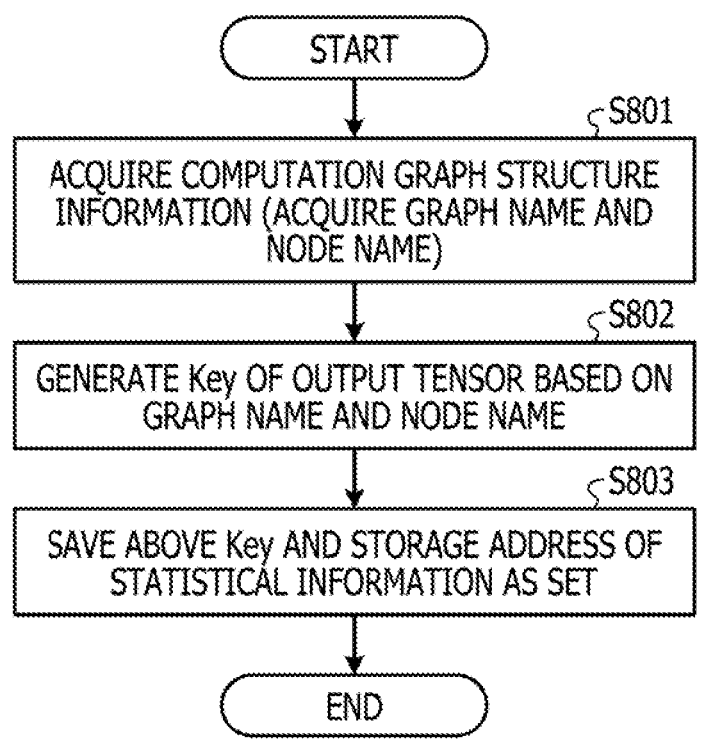
FIG. 16 is a flowchart illustrating a flow of statistical information update processing according to the second embodiment.

FIG. 16 is a flowchart illustrating a flow of statistical information update processing according to the second embodiment. As illustrated in FIG. 16, the deep learning framework execution unit 20 acquires the structure information on the computation graph, such as the graph name and the node name (S801), and generates a key of the output tensor based on the graph name and the node name (S802). Thereafter, the deep learning framework execution unit 20 saves the generated key and the storage address of the statistical information as a set in the statistical information DB 21 (S803).

Effects

Generally, when the scale of the computation graph becomes larger, it becomes difficult to manage the past iteration calculation and the current iteration calculation in association with each other. On the other hand, the information processing device 10 according to the second embodiment may be allowed to associate calculations across iterations and refer to the statistical information by building a database that manages the statistical information. Accordingly, the information processing device 10 according to the second embodiment may implement highly accurate learning while reducing the memory capacity.

Third Embodiment

Incidentally, in the first embodiment, the computation graph generated by "Define by Run" is described as an example; however, when the graph dynamically changes, there is a possibility that the pre-learning is insufficient in the changed part in the graph, and the fluctuations of numerical values to be calculated are not necessarily made smaller. Thus, in a third embodiment, a description will be given of an example in which, by managing the pre-learning and the main learning for each route, a range of the computation graph to be calculated by the floating point is restrained to the expected minimum, even when the statistical information does not exist or the reliability of the statistical information is low.

[Define by Run]

Figure 17:
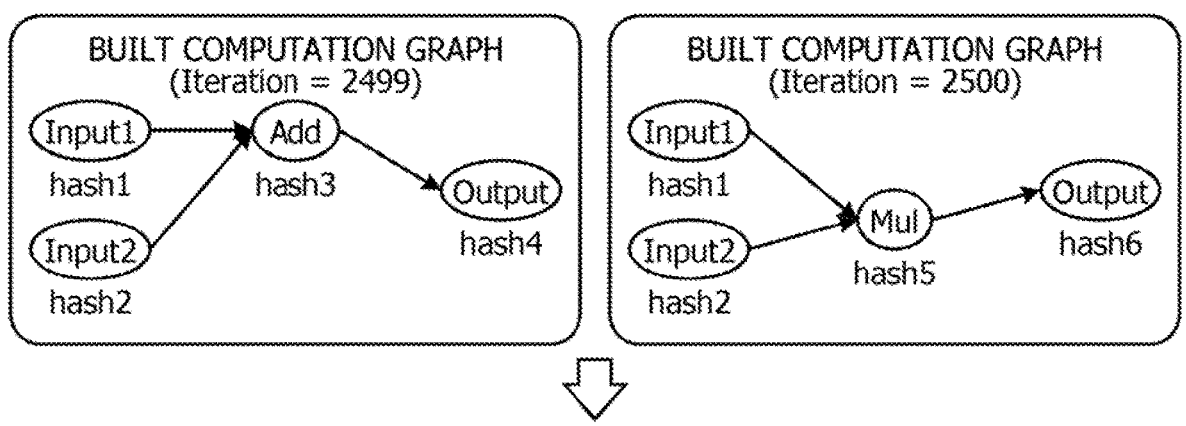
FIG. 17 is a diagram explaining the management of statistical information for a dynamic computation graph according to a third embodiment.

FIG. 17 is a diagram explaining the management of statistical information for a dynamic computation graph according to the third embodiment. As illustrated in FIG. 17, the computation graph for an iteration=2499 is constituted by Input1, Input2, Add, and Output nodes. For example, the node "Add" executes calculation (Add) on the input tensors input from the node "Input1" and the node "Input2", and outputs the execution result to the node "Output". Here, a hash value "hash1" is generated in the node "Input1", and a hash value "hash2" is generated in the node "Input2". In the node "Add", a hash value "hash3" is generated using the hash value "hash1" of the node "Input1" and the hash value "hash2" of the node "Input2". In the node "Output", a hash value "hash4" is generated using the hash value "hash3" of the node "Add".

Furthermore, the computation graph for the next iteration=2500 is constituted by Input1, Input2, Mul, and Output nodes. For example, the node "Add" executes calculation (Mul) on the input tensors input from the node "Input1" and the node "Input2", and outputs the execution result to the node "Output". Here, a hash value "hash1" is generated in the node "Input1", and a hash value "hash2" is generated in the node "Input2". In the node "Mul", a hash value "hash5" is generated using the hash value "hash1" of the node "Input1" and the hash value "hash2" of the node "Input2". In the node "Output", a hash value "hash6" is generated using the hash value "hash5" of the node "Mu".

For example, the computation graph for the iteration=2499 and the graph for the iteration=2500 have the same number of nodes but different calculation routes. For example, the node "Add" and the node "Mul" have the same input nodes but different types of calculation content. For this reason, the calculation route is different between the node "Output" in the iteration=2499 and the node "Output" in the iteration=2500.

In learning such a dynamic computation graph, in the third embodiment, the execution state is saved in the statistical information DB 21 as a set with the hash value. In the execution state, for example, "the number of times the route has been taken" or "the iteration that last updated the statistical information" is registered. "The number of times the route has been taken" is used to discriminate between the pre-learning and the main learning for each route. Since it is thought that the value of a route for which the calculation has been sufficiently repeated has smaller fluctuations, a threshold value is set such that a route whose number of times of being taken has surpassed the threshold value transitions to the main learning.

"The iteration that last updated the statistical information" in the statistical information DB 21 is used to detect a route that has not been taken for a while among routes that have transitioned to the main learning. In such a route, there is a possibility that the statistical information in the database is no longer valid while the main learning progresses; accordingly, when "the iteration that last updated the statistical information" is apart from the current iteration by a threshold value or more, the FLOAT calculation is performed by making conversion into the floating point as in the case of the new route, and the statistical information is updated using the result of the FLOAT calculation.

In this manner, when the pre-learning on the graph is insufficient or the statistical information is old and unreliable, the DLINT calculation in a state in which the pre-learning is insufficient may be avoid within an expected minimum range of influence by performing the floating point calculation only for the involved route.

In the example in FIG. 17, when it is assumed that the DLINT calculation is executed in a case where "the number of times the route has been taken" is equal to or greater than the threshold value (1300), and the FLOAT calculation is executed in other cases, the node "Add" and the node "Output" in the iteration=2499 execute the DLINT calculation, while the node "Mul" and the node "Output" in the iteration=2500 execute the FLOAT calculation. For example, for both of the nodes "Output", the statistical information can be separated between a route that takes the node "Add" and a route that takes the node "Mul". Furthermore, since the database holds the execution state for each calculation route, it is allowed to use the DLINT calculation and the floating point calculation separately for each calculation route. Note that this method may be applied to the static computation graph of "Define and Run". However, since the calculation cost is expected when the hash function is generated, it is preferable to use "access key generation by structure information" when the graph does not change dynamically.

[Define and Run]

Even in a computation graph built by Define and Run, there are cases where the computation in the node is changed depending on the parameter and the input tensor used for the calculation. At this time, it is allowed to refer to appropriate statistical information by generating a "key by route" inside the node as outside the node.

Figure 18:
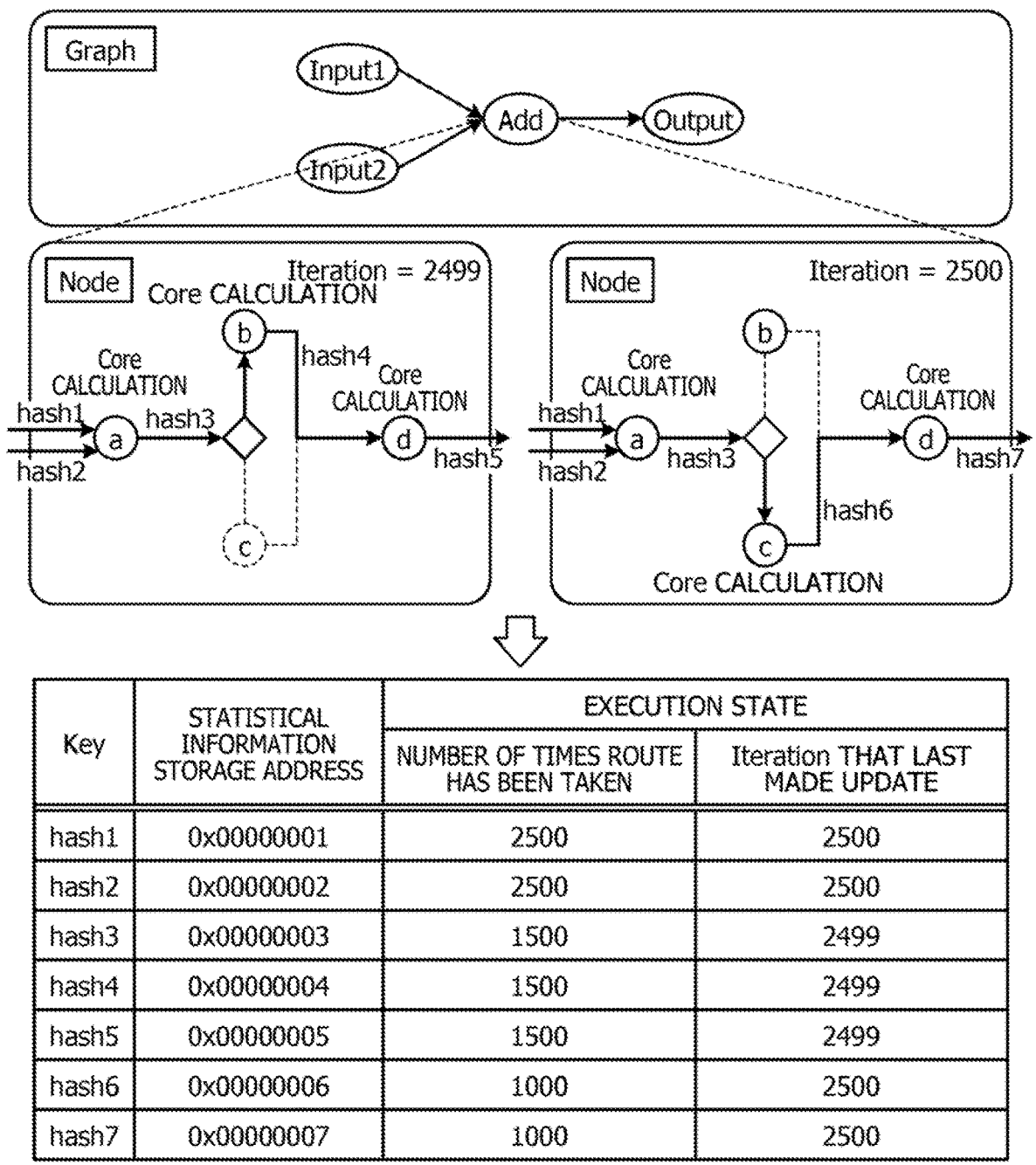
FIG. 18 is a diagram explaining the management of statistical information for a static computation graph according to the third embodiment.

FIG. 18 is a diagram explaining the management of statistical information for a static computation graph according to the third embodiment. FIG. 18 is an example in which different calculations are performed in a node depending on conditional branching. Core calculations a, b, c, and d are each calculation for which the use of statistical information is supposed. At this time, in the calculation in d, there is a possibility that the statistical information is changed between a case where the calculation is performed in a→b→d and a case where the calculation is performed in a→c→d, and therefore it is expected to separate entries of the statistical information DB. Here, these entries may be separated by generating a key that depends on the calculation route.

For example, the node d in the iteration=2499 manages the statistical information by a hash value "hash5" generated using a hash value "hash4" of the node b, while the node d in the iteration=2500 manages the statistical information by a hash value "hash7" generated using a hash value "hash6" of the node c.

In the example in FIG. 18, it is assumed that the DLINT calculation is executed in a case where "the number of times the route has been taken" is equal to or greater than the threshold value (1300), and the FLOAT calculation is executed in other cases. Then, in the node "Output (hash4)" in the iteration=2499, the DLINT calculation is executed because the number of times the route has been taken is 1500, whereas, in the node "Output (hash6)" in the iteration=2500, the FLOAT calculation is executed because the number of times the route has been taken is 1000. For example, even inside the node, the statistical information is allowed to be separated depending on the calculation route.

SPECIFIC EXAMPLES

Next, specific examples of the determination of the calculation scheme based on the execution state will be described with reference to FIGS. 19 to 21. Each of the examples in FIGS. 19 to 21 is constituted by a node A, a node B, a node C, and a node D, and the node D has a calculation route of the node A→the node B→the node D and a calculation route of the node A→the node C→the node D.

Figure 19:
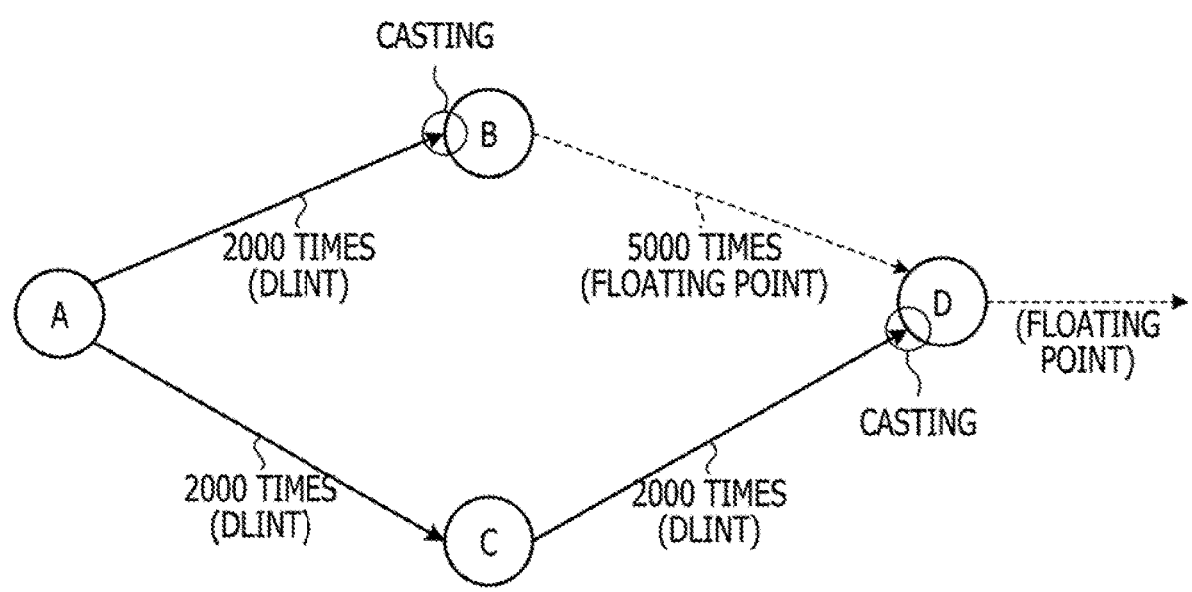
FIG. 19 is a diagram explaining a specific example of calculation processing using statistical information (route) of the third embodiment.

FIG. 19 is a diagram explaining a specific example of calculation processing using statistical information (route) of the third embodiment. As illustrated in FIG. 19, it is assumed that the number of times the route from the node A to the node B has been taken is 2000, the number of times the route from the node A to the node C has been taken is 2000, the number of times the route from the node B to the node D has been taken is 500, and the number of times the route from the node C to the node D has been taken is 2000. If a threshold value "1000" is employed in this case, in the node B, the result of the DLINT calculation is input from the node A, but the output tensor is output in FLOAT (floating point). Therefore, in the node B, the conversion of the data type by casting is executed on the input tensor from the node A to convert the data type from the fixed point type to the floating point type. Then, the node B executes and outputs the FLOAT calculation.

As described above, the node B executes the FLOAT calculation, and the node C executes the DLINT calculation. Then, in the node D, a fixed point type input tensor is input from the node C, and a floating point type input tensor is input from the node B. In this case, in the node D, since the calculation result of the node B is not yet sufficient and the reliability is not high, the conversion of the data type by casting is executed on the input tensor from the node C. Then, the node D executes and outputs the FLOAT calculation using the input from the node C and the input from the node B.

Figure 20:
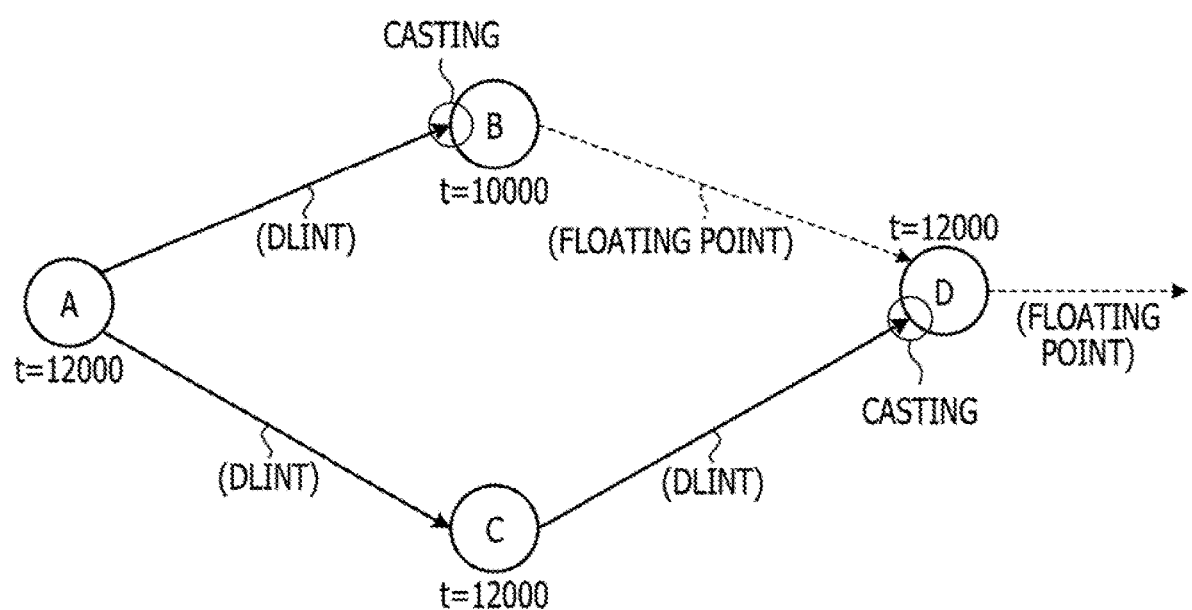
FIG. 20 is a diagram explaining a specific example of calculation processing using statistical information (iteration) of the third embodiment.
Figure 21:
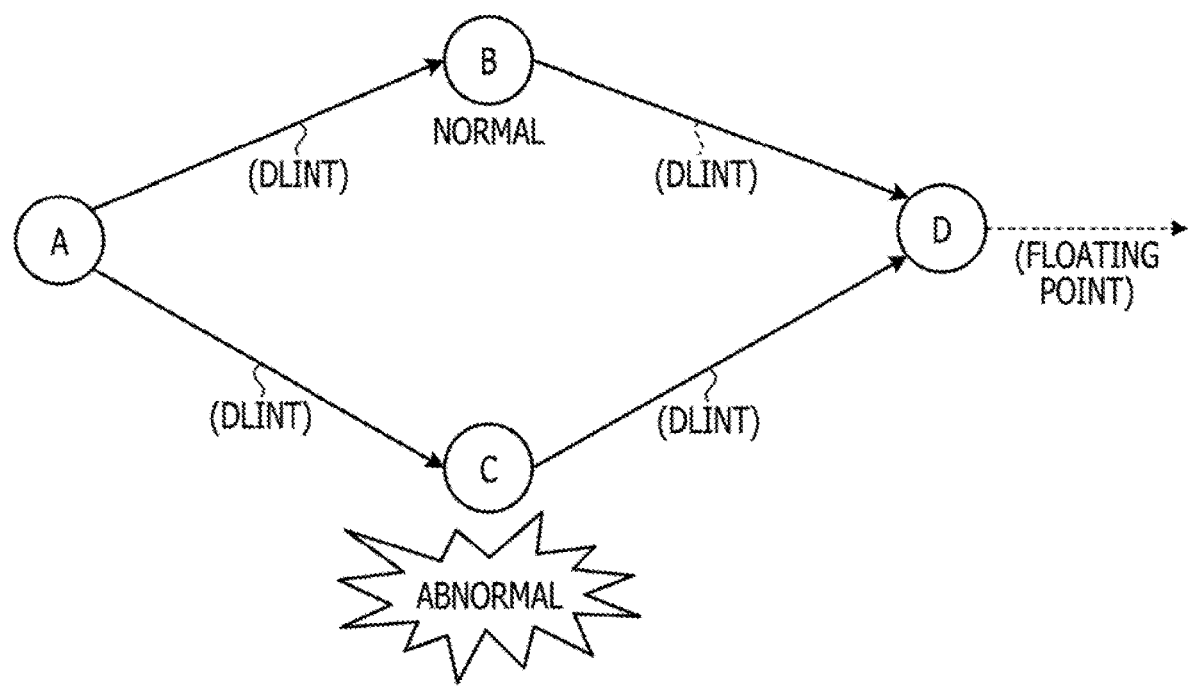
FIG. 21 is a diagram explaining a specific example of calculation processing using statistical information (abnormality) of the third embodiment.

FIG. 20 is a diagram explaining a specific example of calculation processing using statistical information (iteration) of the third embodiment. As illustrated in FIG. 20, it is assumed that the number of times of learning of the node A is 12000, the number of times of learning of the node B is 10000, the number of times of learning of the node C is 12000, and the number of times of learning of the node D is 12000. If a threshold value "10000" is employed in this case, in the node B, the result of the DLINT calculation is input from the node A, but the output tensor is output in FLOAT (floating point). Therefore, in the node B, the conversion of the data type by casting is executed on the input tensor from the node A to convert the data type from the fixed point type to the floating point type. Then, the node B executes and outputs the FLOAT calculation.

As described above, the node B executes the FLOAT calculation, and the node C executes the DLINT calculation. Then, in the node D, a fixed point type input tensor is input from the node C, and a floating point type input tensor is input from the node B. In this case, in the node D, the conversion of the data type is executed on the input tensor from the node C, and the FLOAT calculation is executed and output, as in FIG. 19.

FIG. 21 is a diagram explaining a specific example of calculation processing using statistical information (abnormality) of the third embodiment. As Illustrated in FIG. 21, it is assumed that each node is in a state in which the data type is determined to be DLINT by the technique in FIG. 19 or 20. In this case, when a flag indicating that abnormal processing has occurred has "abnormal" for the node C, the node D determines that the reliability of the node C is low, and executes the data type conversion to execute and output the FLOAT calculation using the input from the node C and the input from the node B.

Note that it is also feasible to determine that a return from the occurrence of an abnormality has been normally made and to execute the DLINT calculation, for example, when a predetermined time has elapsed from the occurrence of the abnormality, or when the predetermined number of times or more of learning has been executed as a whole after the occurrence of the abnormality, or when a node in which the abnormality has occurred has been learned a predetermined number of times or more after the occurrence of the abnormality.

Fourth Embodiment

Although the embodiments have been described above, the embodiments may be implemented in various forms in addition to the above embodiments.

[Data and the Like]

The data examples, numerical value examples, display examples, and the like used in the above embodiments are merely examples, and may be freely modified. Furthermore, the number and types of nodes are also examples, and may be freely modified. Each of the techniques described in the above embodiments may be applied to a variety of types of deep learning including neural networks.

[Data Type]

For example, in each of the techniques described in the third embodiment, nodes after a node distinguished as FLOAT are also determined to be FLOAT. Furthermore, when there is no corresponding hash value in the statistical information DB 21, the calculation route is a route that has not been taken in the past, and there is no statistical information to be referred to. In that case, the DLINT calculation is disabled, and thus the data type is converted and the calculation is performed in the floating point. After the calculation, the statistical information is acquired from the value held by the tensor, and registered in the database as a pair with a key newly issued by this node. At this time, all the routes after this node are routes that do not exist in the statistical information DB 21, and hence the subsequent computations on this route are performed continuously in the floating point.

[Hash Value]

In working out the hash value described above, for example, any that affects the statistical information among the name of the computation node, the key held by each input tensor, and the parameter expected for the calculation, the index of the output tensor, and the like may be used. Note that, when the calculation has a plurality of outputs, the output index is used to discriminate between these outputs.

[System]

Pieces of information including the processing procedure, control procedure, specific name, various types of data and parameters described above in the document or illustrated in the drawings may be changed in any ways unless otherwise specified.

In addition, the respective constituent elements of each device illustrated in the drawings are functionally conceptual and do not necessarily have to be physically configured as illustrated in the drawings. For example, specific forms of distribution and integration of the respective devices are not restricted to the forms illustrated in the drawings. This means that all or a part of the device can be configured by being functionally or physically distributed and integrated in arbitrary units according to various types of loads and usage situations and the like.

Furthermore, all or an arbitrary part of respective processing functions performed in each device may be implemented by a central processing unit (CPU) and a program analyzed and executed by the CPU, or may be implemented as hardware by wired logic.

[Hardware]

Figure 22:
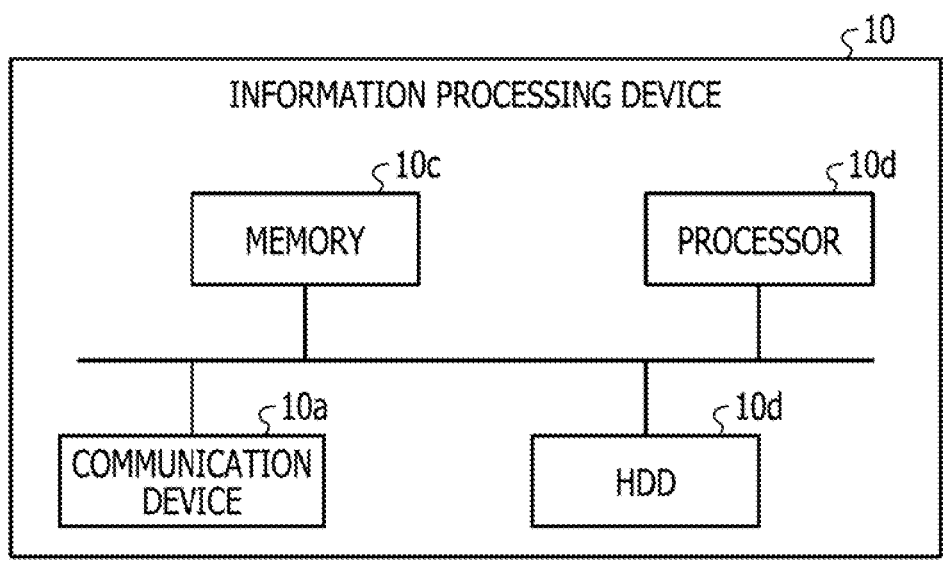
FIG. 22 is a diagram illustrating an example of a hardware configuration.

Next, an example of a hardware configuration of the information processing device 10 will be described. FIG. 22 is a diagram illustrating an example of a hardware configuration. As illustrated in FIG. 22, the information processing device 10 includes a communication device 10a, a hard disk drive (HDD) 10b, a memory 10c, and a processor 10d. Furthermore, the respective parts illustrated in FIG. 22 are mutually connected by a bus or the like.

The communication device 10a is a network interface card or the like and communicates with another server. The HDD 10b stores programs and DBs for operating the functions illustrated in FIG. 3.

The processor 10d reads a program that executes processing similar to the processing of each processing unit illustrated in FIG. 3 from the HDD 10b or the like to develop the read program in the memory 10c, thereby operating a process that executes each function described with reference to FIG. 3 and other drawings. For example, this process executes a function similar to the function of each processing unit included in the information processing device 10. For example, the processor 10d reads a program having functions similar to the functions of the deep learning framework execution unit 20, the deep learning dedicated calculation unit 30, and the like from the HDD 10b or the like. Then, the processor 10d executes a process that executes processing similar to the processing of the deep learning framework execution unit 20, the deep learning dedicated calculation unit 30, and the like.

As described above, the information processing device 10 operates as an information processing device that executes the learning method by reading and executing a program. The information processing device 10 can also implement functions similar to the functions of the above-described embodiments by reading the program described above from a recording medium by a medium reading device and executing the read program described above. Note that this program referred to in other embodiments is not limited to being executed by the information processing device 10. For example, the embodiments can be similarly applied to a case where another computer or server executes the program, or a case where such computer and server cooperatively execute the program. Note that two processors, namely, a processor that executes the deep learning framework execution unit 20 and a processor that executes the deep learning dedicated calculation unit 30, may also be arranged.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a learning program for causing a computer to execute a process comprising:
referring to, at time of learning a computation model that is a target of deep learning and has a plurality of nodes, a storage unit in which route information that indicates a calculation route followed by a tensor in each stage of learning prior to the time of learning, and statistical information regarding a position of a decimal point used in the calculation route are associated with each other;
acquiring, when executing each piece of calculation processing set in each of the plurality of nodes at the time of learning, the statistical information corresponding to the route information that reaches each of the plurality of nodes;
executing the each piece of calculation processing using the position of the decimal point specified by the acquired statistical information; and
determining a learning stage of the computation model, the executing executes each piece of the calculation processing of each of the plurality of nodes using a floating point calculation when the learning stage of the computation model is a first stage, and executes each piece of the calculation processing of each of the plurality of nodes using a fixed point calculation set with a decimal point position specified by each piece of the statistical information when the learning stage of the computation model is a second stage that is a later part than the first stage.

2. The non-transitory computer-readable recording medium according to claim 1, wherein the process further includes: storing, when the computation model is a model whose structure changes in a stage of learning, the route information and the statistical information in the storage unit in association with each other, and storing, when the computation model is a model whose structure does not change in a stage of learning, each piece of identification information that specifies the plurality of nodes and the statistical information in the storage unit in association with each other, wherein the acquiring determines a type of the computation model, and executes generation of the route information or generation of the identification information at time of learning the computation model according to a result of determination.

3. The non-transitory computer-readable recording medium according to claim 1, wherein the process further includes: working out a hash value using information regarding an input tensor input to a node and information regarding calculation processing executed by the node; acquiring the statistical information used by the node; and storing the hash value and the statistical information in the storage unit in association with each other, wherein the acquiring works out the hash value using the input tensor input to the node as a processing target and the information regarding the calculation processing executed in the node as the processing target, and acquires the statistical information corresponding to the hash value to execute the calculation processing.

4. The non-transitory computer-readable recording medium according to claim 1, wherein the process further includes determining an execution state of each of the plurality of nodes, wherein the executing suppresses the fixed point calculation for a node of which the execution state does not satisfy a predetermined condition even in the second stage, and executes the calculation processing using the floating point calculation.

5. The non-transitory computer-readable recording medium according to claim 4, wherein the determining determines, as the execution state, a number of times a route specified by the route information has been taken by the time of learning, a time of final update when the statistical information was last updated, or whether or not the calculation processing succeeded, and the executing suppresses the fixed point calculation when the number of times is less than a threshold value, a difference between a time of current learning and the time of final update is equal to or greater than a threshold value, or the calculation processing is in an abnormal state, and executes the calculation processing using the floating point calculation.

6. A learning method comprising:
referring to, by a computer, at time of learning a computation model that is a target of deep learning and has a plurality of nodes, a storage unit in which route information that indicates a calculation route followed by a tensor in each stage of learning prior to the time of learning, and statistical information regarding a position of a decimal point used in the calculation route are associated with each other;

acquiring, when executing each piece of calculation processing set in each of the plurality of nodes at the time of learning, the statistical information corresponding to the route information that reaches each of the plurality of nodes;

executing the each piece of calculation processing using the position of the decimal point specified by the acquired statistical information; and determining a learning stage of the computation model, the executing executes each piece of the calculation processing of each of the plurality of nodes using a floating point calculation when the learning stage of the computation model is a first stage, and executes each piece of the calculation processing of each of the plurality of nodes using a fixed point calculation set with a decimal point position specified by each piece of the statistical information when the learning stage of the computation model is a second stage that is a later part than the first stage.

* * * * *